(12) United States Patent
Faure

(10) Patent No.: US 10,751,636 B2
(45) Date of Patent: Aug. 25, 2020

(54) SYSTEMS AND METHODS FOR FORMING REULEAUX SHAPES

(71) Applicant: Bertrand Faure, Sands Point, NY (US)

(72) Inventor: Bertrand Faure, Sands Point, NY (US)

( * ) Notice: Subject to any disclaimer, the term of this patent is extended or adjusted under 35 U.S.C. 154(b) by 0 days.

(21) Appl. No.: 16/176,593

(22) Filed: Oct. 31, 2018

(65) Prior Publication Data

US 2019/0060775 A1    Feb. 28, 2019

Related U.S. Application Data

(62) Division of application No. 14/703,586, filed on May 4, 2015, now Pat. No. 10,137,382.

(60) Provisional application No. 61/987,895, filed on May 2, 2014.

(51) Int. Cl.
*A63H 33/00* (2006.01)
*B29K 509/00* (2006.01)
*B29K 103/00* (2006.01)
*B29K 83/00* (2006.01)
*B29K 103/08* (2006.01)

(52) U.S. Cl.
CPC ...... *A63H 33/001* (2013.01); *B29C 2791/001* (2013.01); *B29K 2083/00* (2013.01); *B29K 2083/005* (2013.01); *B29K 2103/08* (2013.01); *B29K 2509/00* (2013.01)

(58) Field of Classification Search
CPC ............ A63H 33/001; B29K 2083/005; B29K 2103/08; B29K 2083/00; B29K 2509/00; B29C 2791/001
See application file for complete search history.

(56) References Cited

PUBLICATIONS

Dutchess 36 Part Dough Divider and Rounder (as demonstrated in YouTube video https://www.youtube.com/watch?v=XNnMqlrhCsQ (viewed on Dec. 23, 2017 and published on Aug. 27, 2013)) (Year: 2013) (found in parent application).*

* cited by examiner

*Primary Examiner* — Robert J Grun
(74) *Attorney, Agent, or Firm* — Cooper & Dunham LLP

(57) ABSTRACT

Methods for forming a Reuleaux shape from a material involving placing the material into a container, moving the container along an orbit until the motion of the container along the orbit causes the material to assume a Reuleaux shape, and removing the Reuleaux shape from the container. Devices for transforming material into a Reuleaux shape, including a wheel, a platter mounted on the wheel, and a container mounted on the platter. Kits for forming a Reuleaux pentagon, including material having sand and silicone and a hexagonal container.

20 Claims, 49 Drawing Sheets

Fig. 2AAA
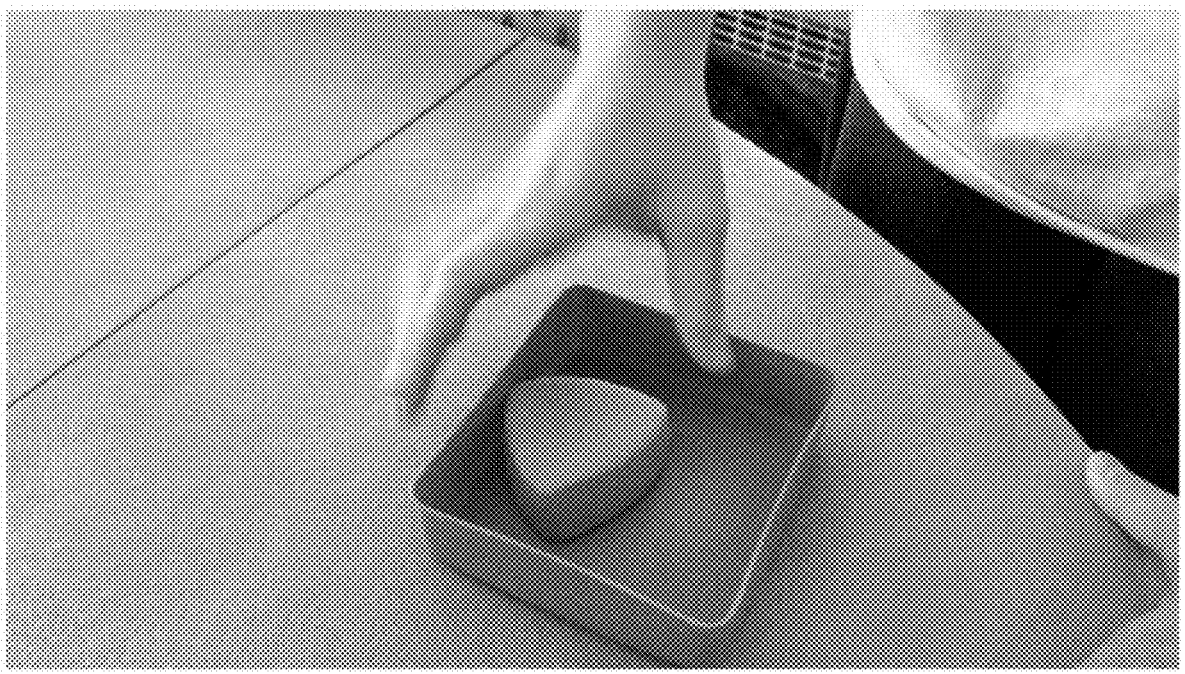
Fig. 2BBB

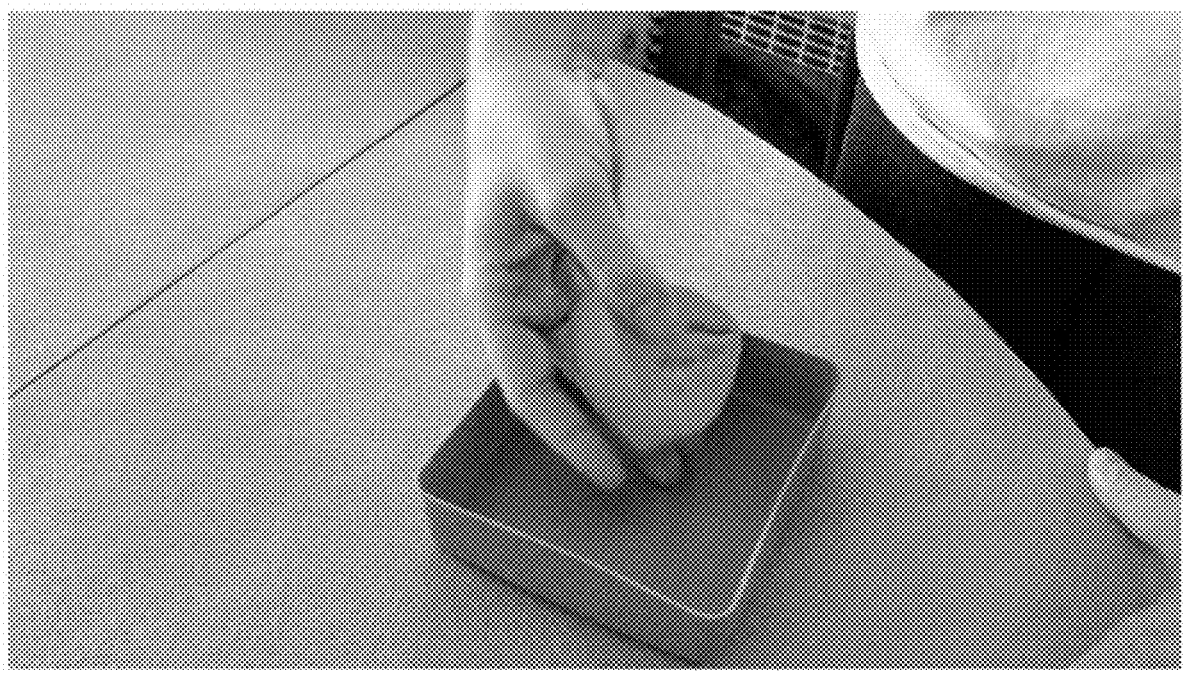
Fig. 2CCC
Fig. 2DDD

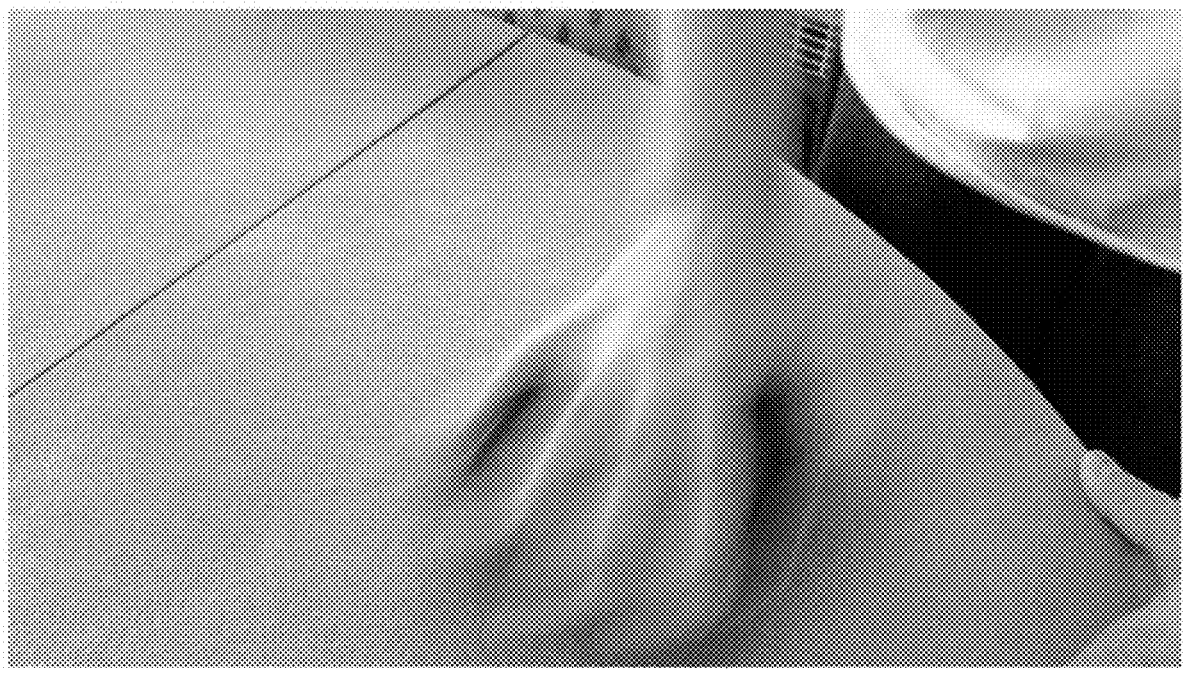
Fig. 2EEE
Fig. 2FFF

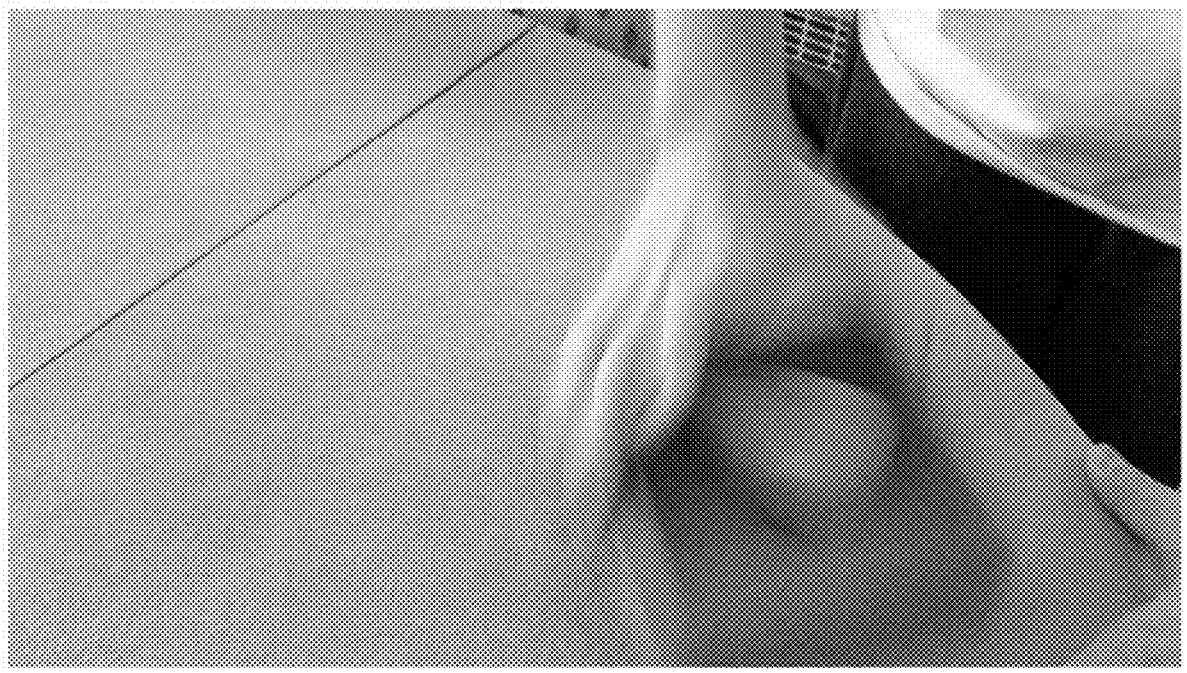
Fig. 2GGG
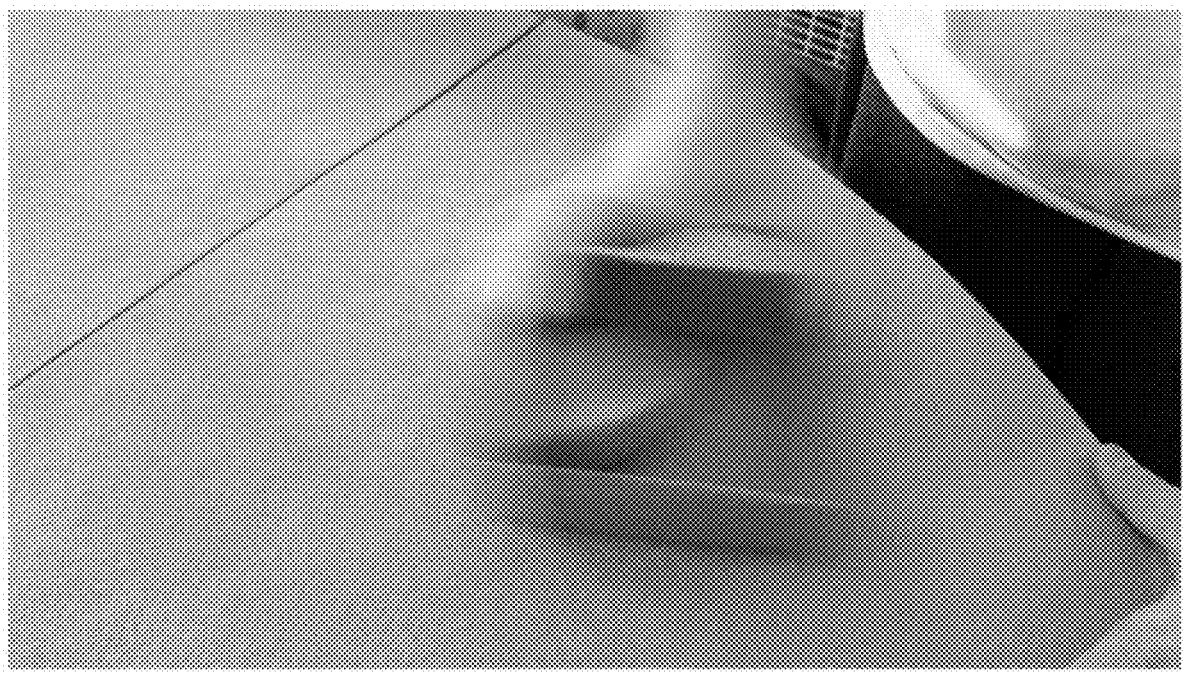
Fig. 2HHH

Fig. 2III
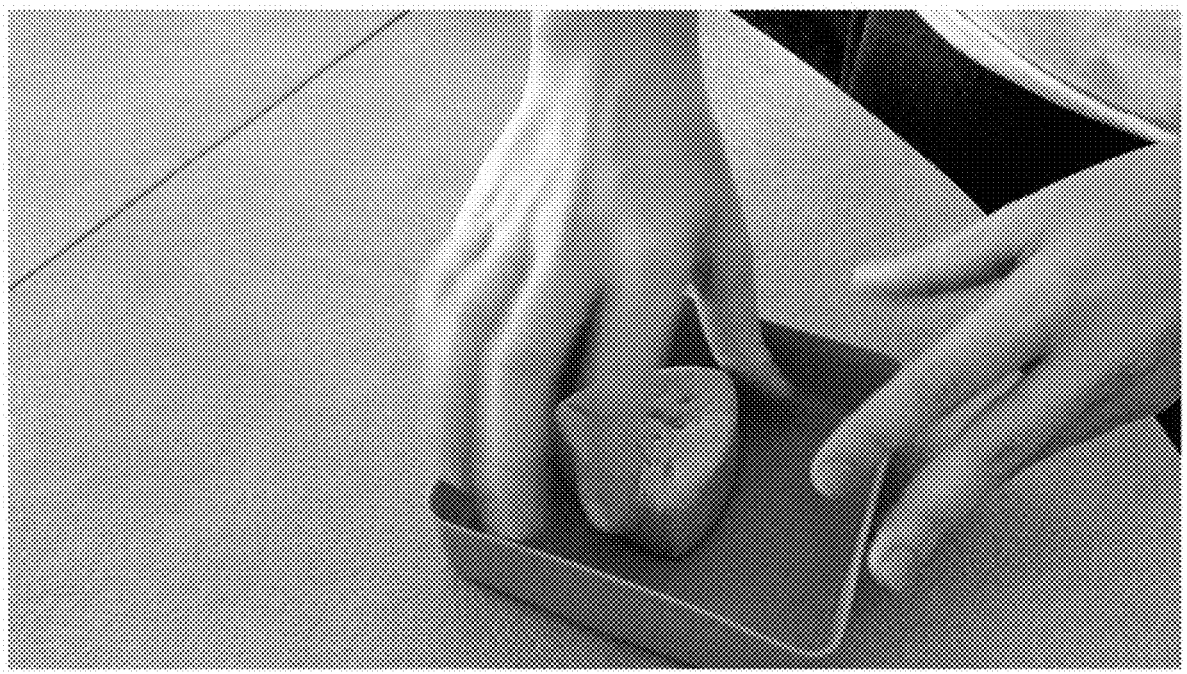
Fig. 2JJJ

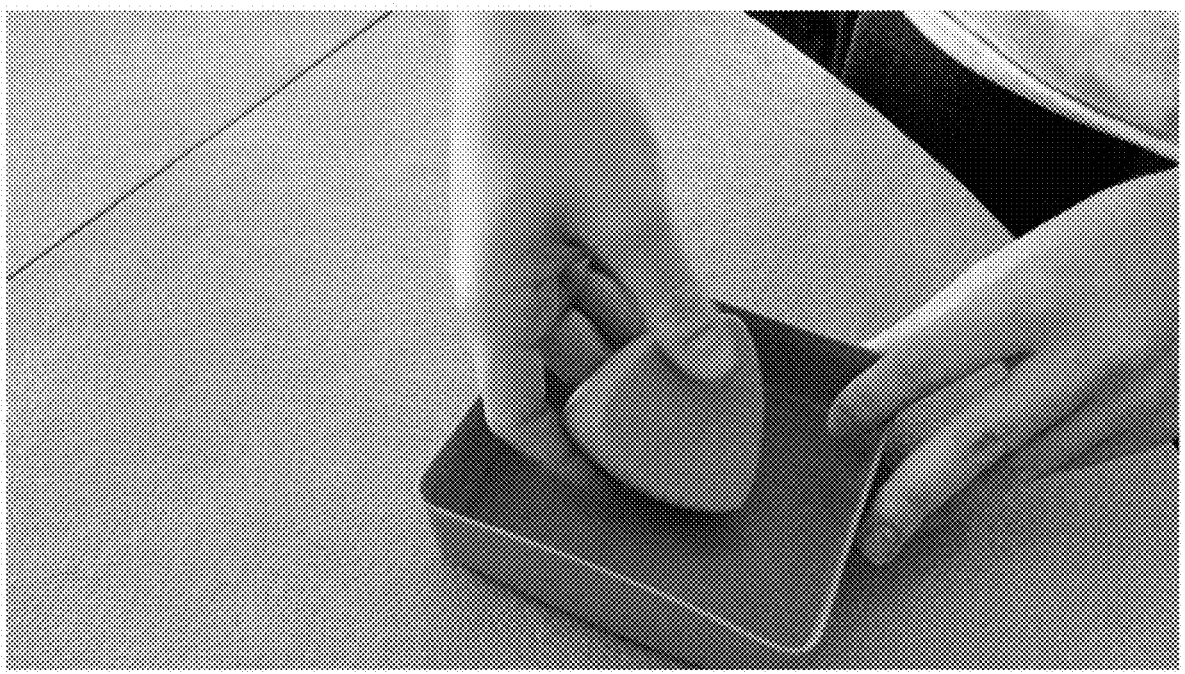
Fig. 2KKK
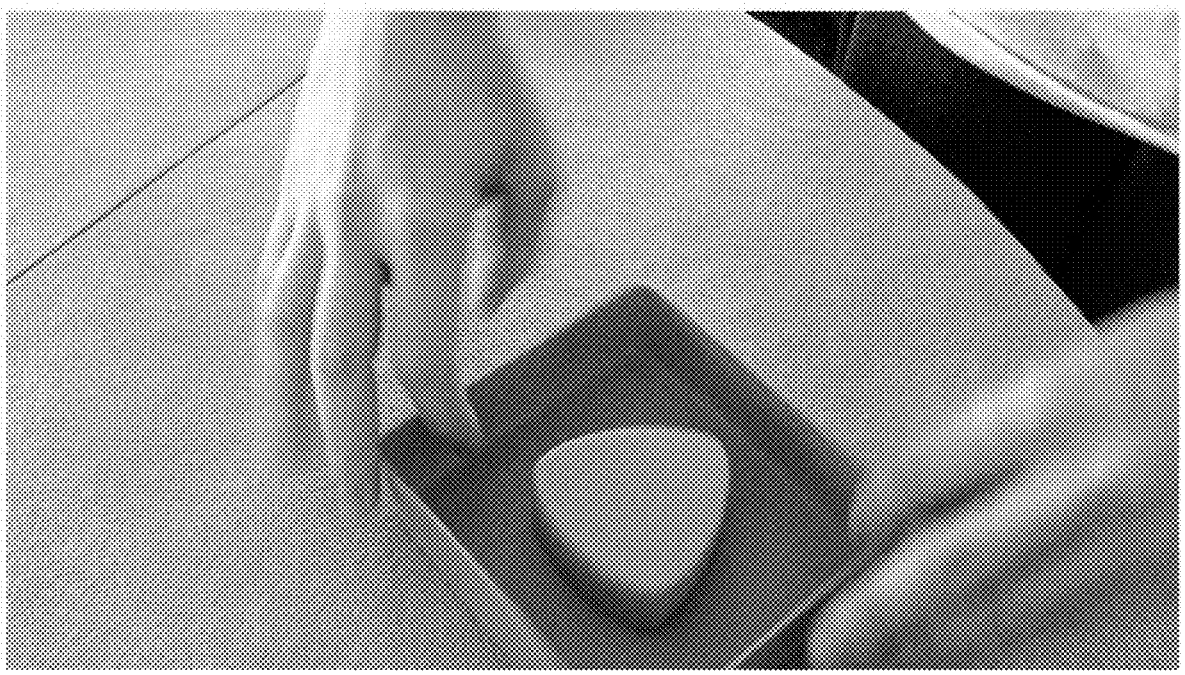
Fig. 2LLL

Fig. 2MMM
Fig. 2NNN

Fig. 2OOO
Fig. 2PPP

SYSTEMS AND METHODS FOR FORMING REULEAUX SHAPES

CROSS REFERENCE TO RELATED APPLICATIONS

This application claims the benefit of and priority to U.S. non-provisional patent application Ser. No. 14/703,586, titled "SYSTEMS AND METHODS FOR FORMING REULEAUX SHAPES", filed May 4, 2015.

This application claims the benefit of and priority to U.S. provisional patent application Ser. No. 61/987,895, titled "SYSTEMS AND METHODS FOR FORMING REULEAUX SHAPES," filed May 2, 2014, and incorporates this application by reference.

BACKGROUND

Polygons of constant width and height, with an odd number of sides greater than or equal to three, also known as Reuleaux polygons (named after Franz Reuleaux, a German engineer who lived from 1829-1905), have unusual and useful properties which would be understood to one of skill in the art. For example, manhole covers are almost always round, because if they were any other common shape such as a rectangle, a triangle, or an oval, having one side smaller than the other means they would easily fall into their own manhole during installation or if dislodge by a passing vehicle, Reuleaux polygon shapes, such as a Reuleaux triangle, or pentagon, improve on the circle; not only will they not fall into a corresponding manhole, but they will also not roll away almost indefinitely as a circular-shaped manhole cover would. Reuleaux-shaped manhole covers, unlike circle-shaped manhole covers, also will not rotate when installed, so that warnings, text or images written thereon will stay oriented the same way as when they were installed. Further, and importantly as security is a growing concern for large public events such as marathons, Reuleaux-shaped manhole covers are difficult to counterfeit or tamper with, especially when welded shut.

Because of their beneficial properties, Reuleaux shapes have also been used for coins in certain countries, especially in the Commonwealth of England, and most often as Reuleaux heptagons. They are difficult to counterfeit, and due to their constant width, roll easily in vending machines. Reuleaux shapes have also been used in pencils and drill bit inserts.

Reuleaux shapes also have a constant height as they are rolled along a flat surface, and thus a flat object, such as a ruler laid atop one or more identical rolling Reuleaux shapes will, translate horizontally but not vertically. The center of the Reuleaux shape will, however, move up and down.

Reuleaux shapes can be made by subtractive manufacturing, that is, using equipment such as saws, drills, milling machines, lathes and CNC machines to take away extra material from a larger object until it is in a Reuleaux shape. The extra material that was purchased becomes waste, and has to be discarded or recycled at an additional cost.

Reuleaux shapes can also be made by additive manufacturing, where parts are assembled, welded, glued or bolted on. However, this is ineffective particularly for certain material that will not fuse with separately created-pieces of like material (such as ceramics and certain plastics including polypropylene).

Reuleaux shapes can also be made by casting or 3D printing, but these are expensive options.

Accordingly, it would be advantageous for there to be systems and methods for generating Reuleaux shapes, without the need for specialized molds, machining, carving, stamping, or tooling, all of which would add to the manufacturing cost.

BRIEF DESCRIPTION OF THE INVENTION

In one embodiment, of the present invention, there is a method of forming a Reuleaux shape from a material including placing the material into a container, moving the container along an orbit a plurality of times until the motion of the container along the orbit causes the material to assume a Reuleaux shape, and removing the Reuleaux shape from the container. The Reuleaux shape may be a Reuleaux triangle. The container may be a quadrilateral. The Reuleaux shape may be a Reuleaux pentagon, and the container may be a hexagon. The material may be a paste-like substance. Between one quarter of a cup and three quarters of a cup of the material may be used. The material may comprise sand and silicone, and it may comprise approximately 98% sand and approximately 2% silicone. The material may be kept at a humidity between 40% and 70%. The material may weigh between 30 and 52 grams. The material may be formed into a circular or near-circular disc shape before the motion of the container along the orbit causes the material to assume the Reuleaux shape.

The moving of the container may involve translation but not rotation of the container. The moving of the container may be performed for between 30 seconds and 10 minutes. A track may be used to guide the moving of the container. A vertical rod, or a small shape from 2 cm to 7 cm in diameter, may be used to guide the moving of the container. The orbit is circular, square, in the shape of a square with rounded corners, or of a circle with compressed sides, elliptical or oval. The orbit may be a first ellipse or oval and a second ellipse or oval stacked, the first ellipse or oval being elongated front to back, and the second ellipse or oval being elongated right to left. The orbit may be concave. The orbit may be along a horizontal plane or surface. The moving of the container may occur both clockwise and counter-clockwise. The container may have interior dimensions approximately 9.5 cm by 9.5 cm. The orbit may have a diameter and the container may have an interior width such that the diameter of the orbit is between one and two times the interior width of the container. The motion of the container may be mechanized. The Reuleaux shape may be frozen and then baked.

The baking may occur at between 250 and 290 degrees for between 180 and 300 minutes. The Reuleaux shape may have a maximum thickness that is approximately 20% of its width. The container may be plastic, polypropylene or polycarbonate. The container may have a top, and it may have a bottom. The container may have knoblike feet on the bottom. The container may have no bottom. There may be a plurality of breaks during the moving of the container, and the method may further involve flattening the material during at least one of the plurality of breaks, and flipping the material over during at least one other of the plurality of breaks. The container may be mounted on a platter that is mounted on a wheel, and the platter and the wheel may be used in the moving of the container. The material may be pre-treated by heating it at between 70 and 130 degrees Celsius for between 5 and 1.5 minutes. The container may be a cube-shaped container, and the Reuleaux shape may be a three-dimensional Reuleaux shape. During the moving of the cube-shaped container, the cube-shaped container may be positioned in multiple different orientations, such that at least three faces of the cube-shaped container are faced upwards.

In another embodiment of the present invention, a device for transforming material into a Reuleaux shape includes a wheel, a platter mounted on the wheel, and a container mounted on tire platter. The container may be removably mounted on the platter by a mount. The mount may be size-adjustable to receive containers of different sizes. The platter may have one or more handles. The wheel may have ball bearings.

In yet another embodiment of the present invention, there is a kit for forming a Reuleaux pentagon, including a material comprising sand and silicone and a hexagonal container. The material may comprise approximately 98% sand and approximately 2% silicone.

DETAILED DESCRIPTION OF THE INVENTION

Embodiments of the present invention solve the problems discussed in the Background section through the use of a different manufacturing process that is neither additive, subtractive, or based on casting. Rather, in embodiments of the present invention, movement is harnessed to shape material 10 into a Reuleaux shape 11. As will be understood by one of skill in the art, no manufacturing method results in geometrically perfect shapes, and accordingly terms Reuleaux shape, Reuleaux polygon, Reuleaux triangle, Reuleaux pentagon, etc., when applied to physical objects, refers to an approximation of a geometrically perfect version of the named Reuleaux shape, as will be understood by one of ordinary skill in the art based on acceptable manufacturing tolerances and the images presented in this application.

Figure 1:
FIG. 1 shows a Reuleaux triangle made according to one embodiment of the present invention.

In embodiments of the invention, a material 10 is used that will ultimately become the Reuleaux shape 11 (such as is shown in FIG. 1), as well as a holding container 20. The material 10 may be a paste-like substance, and about a half-cup of the material 10 may be used may be used, as shown in the Figures. A different amount of material 10 may be used, for example, from one quarter to three quarters of a cup, depending on the size of Reuleaux shape 11 desired and the holding container 20 selected. Depending on the fluidity of the material, it may be moved into the holding container 20 with a tool such as a spoon, or by hand, or poured directly into the holding container 20. The holding container 20, and therefore also the material 10, are subjected to a series of movements. In certain embodiments, these movements are applied for a lime period between less than a minute and several, minutes. For example, the movements in some embodiments may be applied for 30 seconds, 45 seconds, 1 minute, 2 minutes, 3 minutes, 4 minutes, 5 minutes or 10 minutes, or any range between these various times. As a result of these movements, the material 10 forms a Reuleaux polygon 11. In certain embodiments, the material 10 becomes a Reuleaux triangle 11. In certain other embodiments, it becomes a Reuleaux pentagon. In some embodiments, the thickness of the Reuleaux polygon 11 formed is less than its width. The maximum thickness may be approximately 20% of the width. The ratio of thickness to width is dependent on the particular material used, the speed of the movement, the sequence of movement orbits, and other factors including humidity.

A large rectangular or square tray, with slightly raised sides, such as used in a cafeteria, can be used to create a Reuleaux shape 11 according to embodiments of the invention. For example, a 14"×20" tray can be used. Other flat surfaces 21 can also be used, as will be understood by one of skill in the art.

A container 20, such as a square plastic container for forming a three-sided Reuleaux 11—that is, a "Reuleaux triangle" 11) can be used. However, in another embodiment, a container 20 having a slippery, hard, smooth bottom surface is used. The container 20 can be made of polypropylene according to an embodiment. However, in another embodiment, the container 20 is made of polycarbonate. In yet another embodiment, the polycarbonate is clear poly carbonate. In certain embodiments, small knoblike feet, on the bottom of the container are used to reduce friction. The container 20 may have a top or not have a top. The container 20 may have a bottom or not have a bottom, (in which latter case it is analogous in shape to a section, of a pipe).

In an embodiment, the material 10 is formed from a mixture of sand and silicone. The sand may be high grade sand. The proportions may be approximately 98% sand or high grade sand and approximately 2% silicone. Small amounts of other ingredients may be used, including Polydimethylsiloxane (PDMS), which gives the material enhanced flow properties, and/or boric acid, which helps the material bind together. The raw material may be kept at room temperature. The raw material 10 may be kept at a medium humidity. In one embodiment, the humidity is between 40% and 70%. In certain embodiments, WABA Fun, LLC's Kinetic Sand product may be used, which is 98% pure sand. However, in other embodiments, compounds and materials having similar properties can be used, as will be understood by one of skill in the art. For example, the materials substituted for Kinetic Sand as discussed at http://www.chemicalforums.com/index.php?topic=70895.0 and http://www.chemicalforums.com/index.php?topic=70895.15 may be used.

Measuring tools, such as a ruler, caliper, and precision scale (such as a digital scale with a tare function) may also be used in confirming the attributes of the raw materials, equipment, and resulting Reuleaux shape.

In embodiments of the present invention, applying certain types of motion to a portion of the appropriate raw material 10, placed in a suitable container 20, results in the formation of a three-sided Reuleaux shape 11.

In certain embodiments, the raw material 10 is initially formed into a circular or near-circular "patty" shape (analogous to the shape of a hamburger patty).

According to certain embodiments of the present invention, no mold, machining, carving, stamping, or tooling is, or need be, employed.

According to embodiments of the invention, the tray is on a horizontal plane or surface. In alternate embodiments, no tray is used, and the container 20 is placed directly on a horizontal plane or surface 21.

Figure 2A:
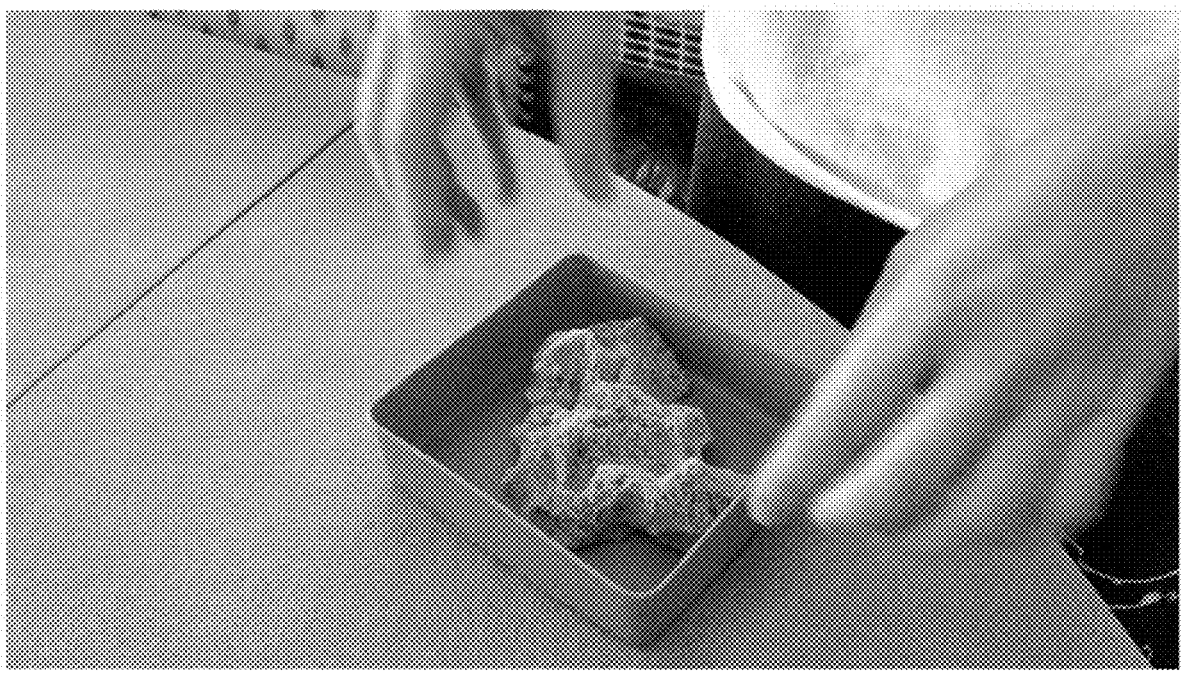
FIGS. 2A-2PPP show a method for making a Reuleaux triangle according to an embodiment of the present invention.
Figure 2B:
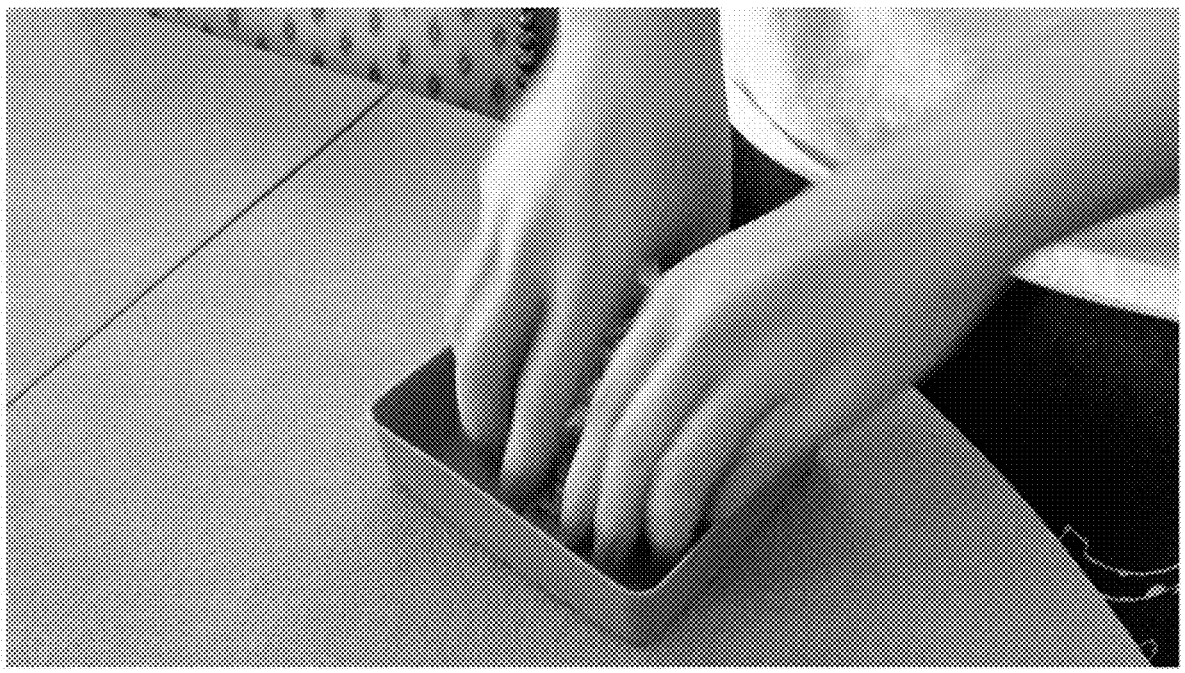
Figure 2C:
Figure 2D:
Figure 2E:
Figure 2F:
Figure 2G:
Figure 2H:
Figure 2I:
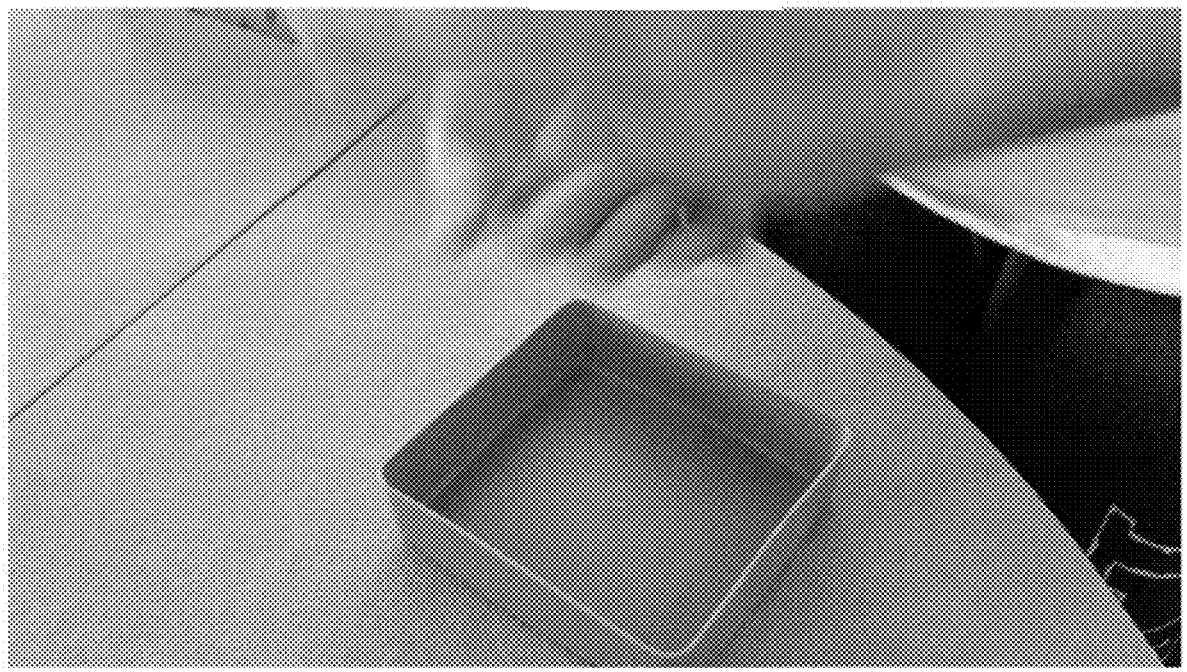
Figure 2J:
Figure 2K:
Figure 2L:
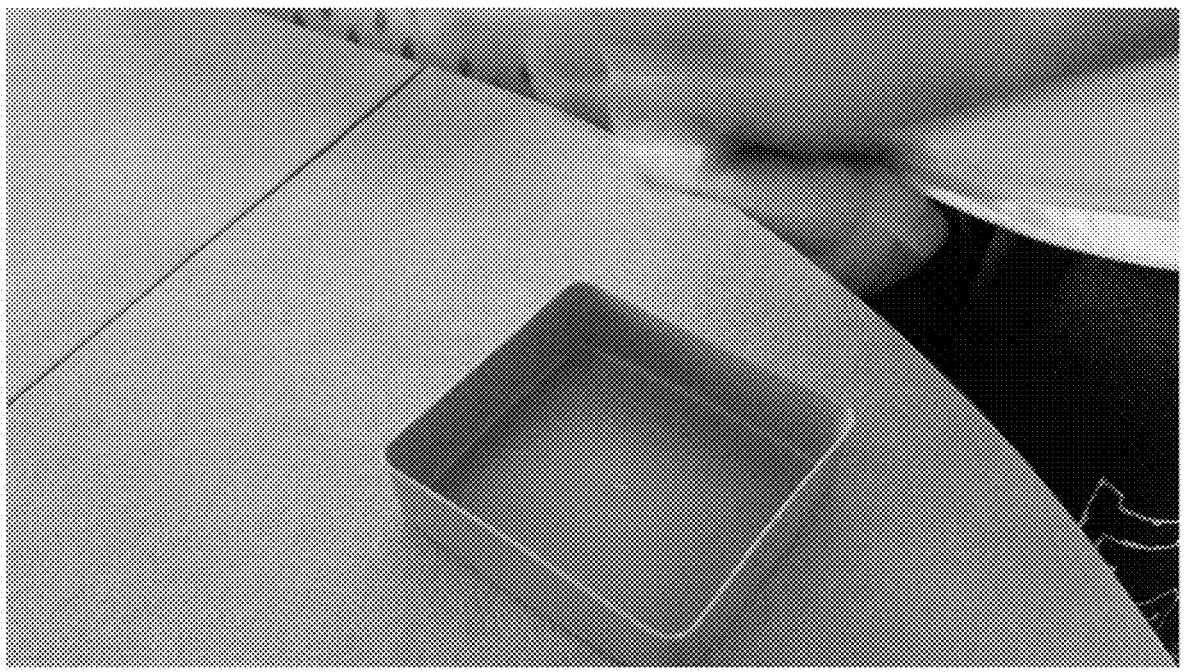
Figure 2M:
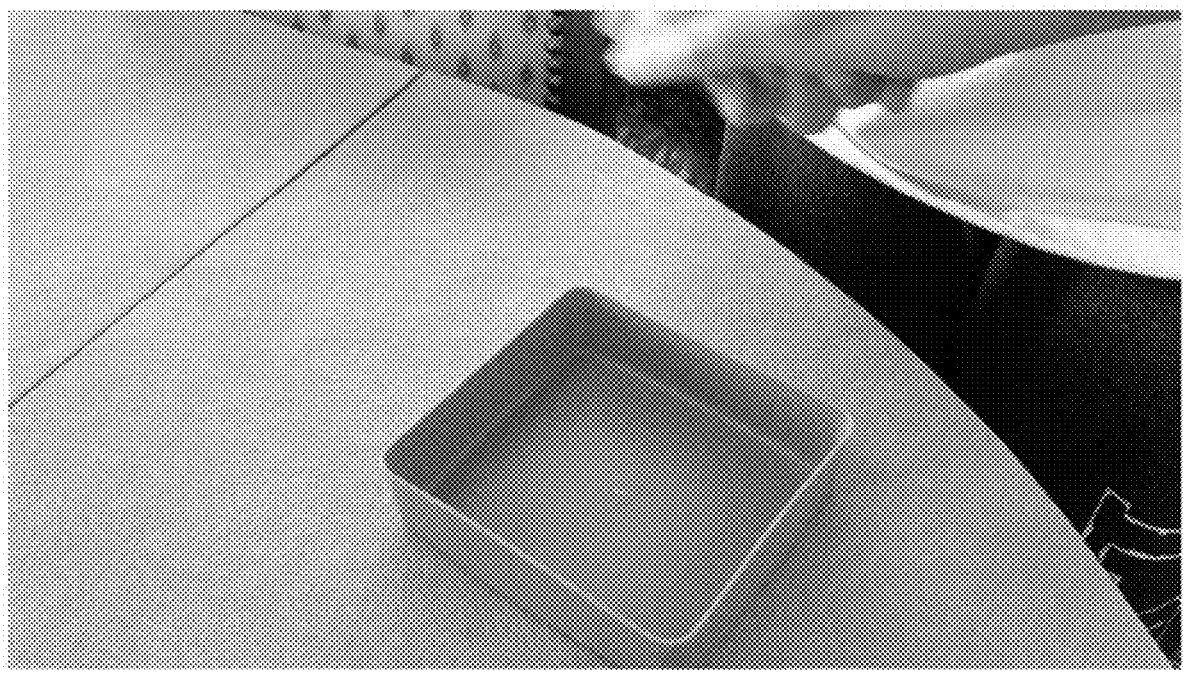
Figure 2N:
Figure 2O:
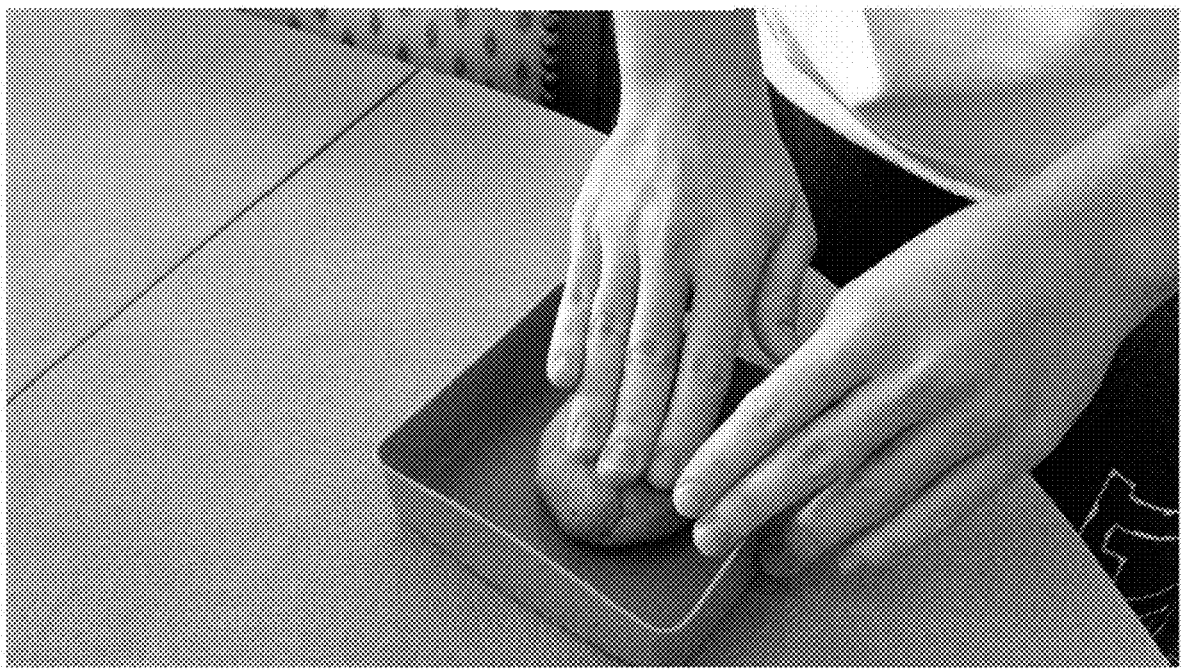
Figure 2P:
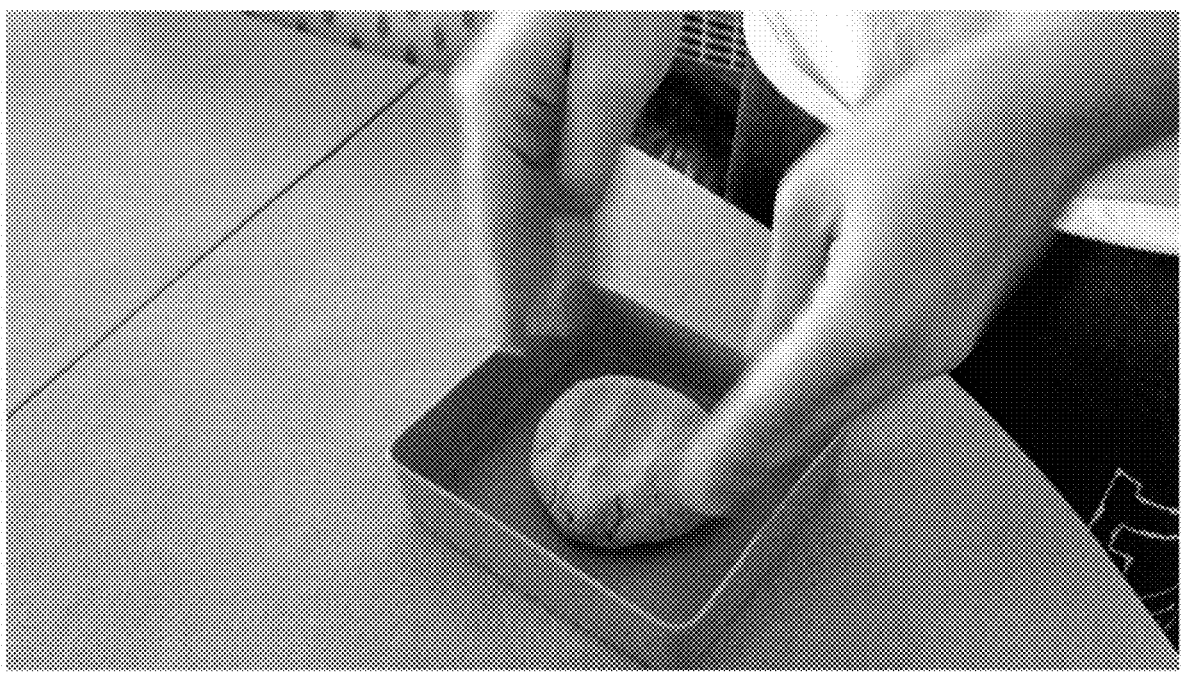
Figure 2Q:
Figure 2R:
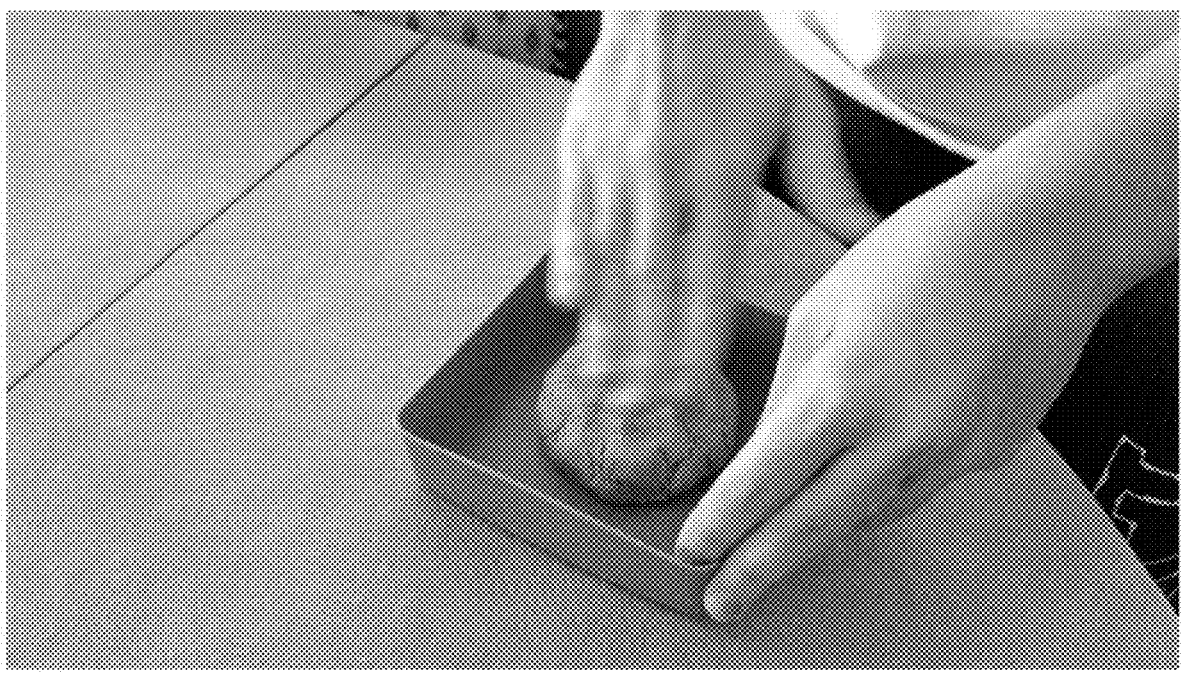
Figure 2S:
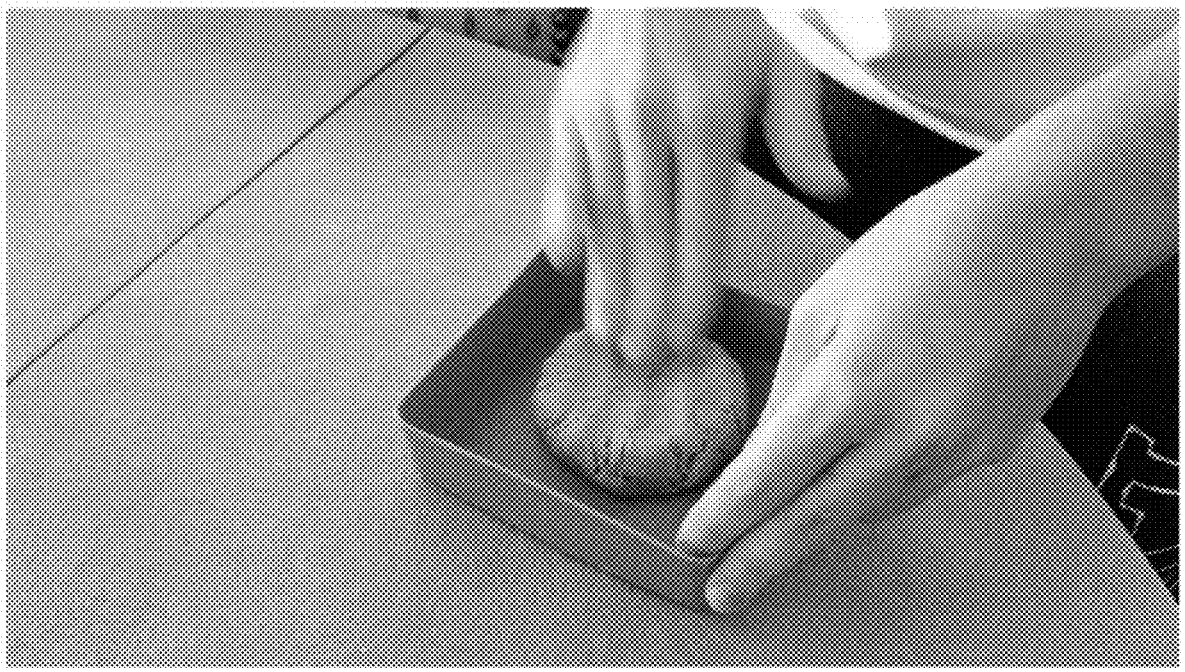
Figure 2T:
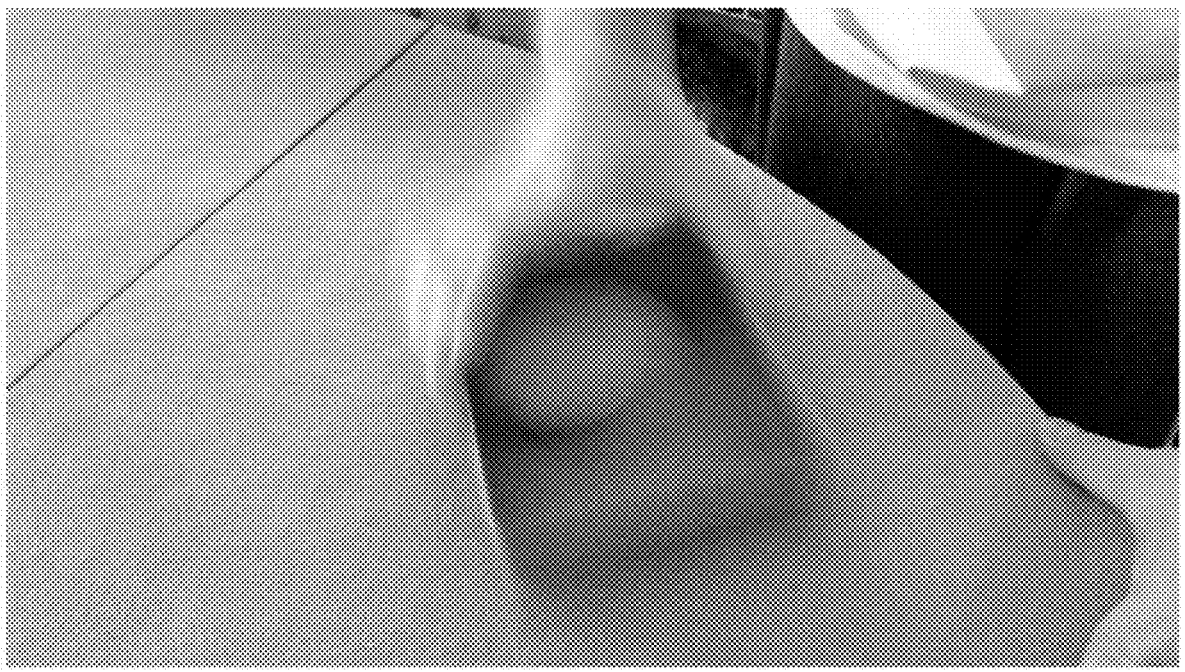
Figure 2U:
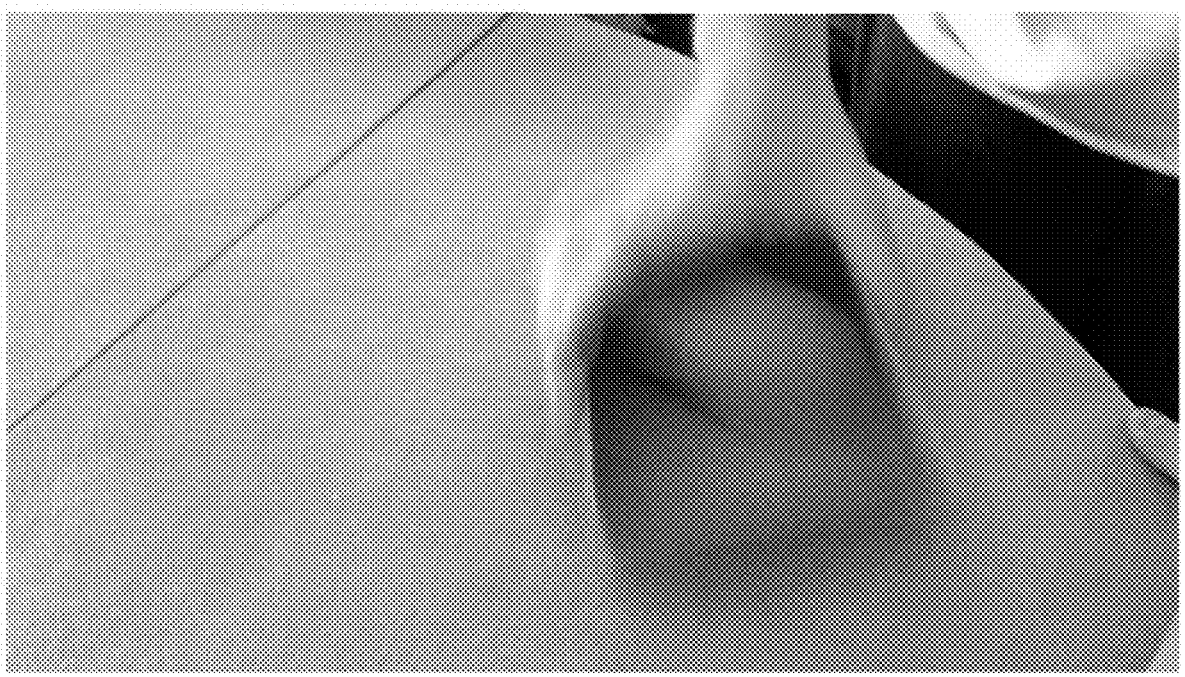
Figure 2V:
Figure 2W:
Figure 2X:
Figure 2Y:
Figure 2Z:
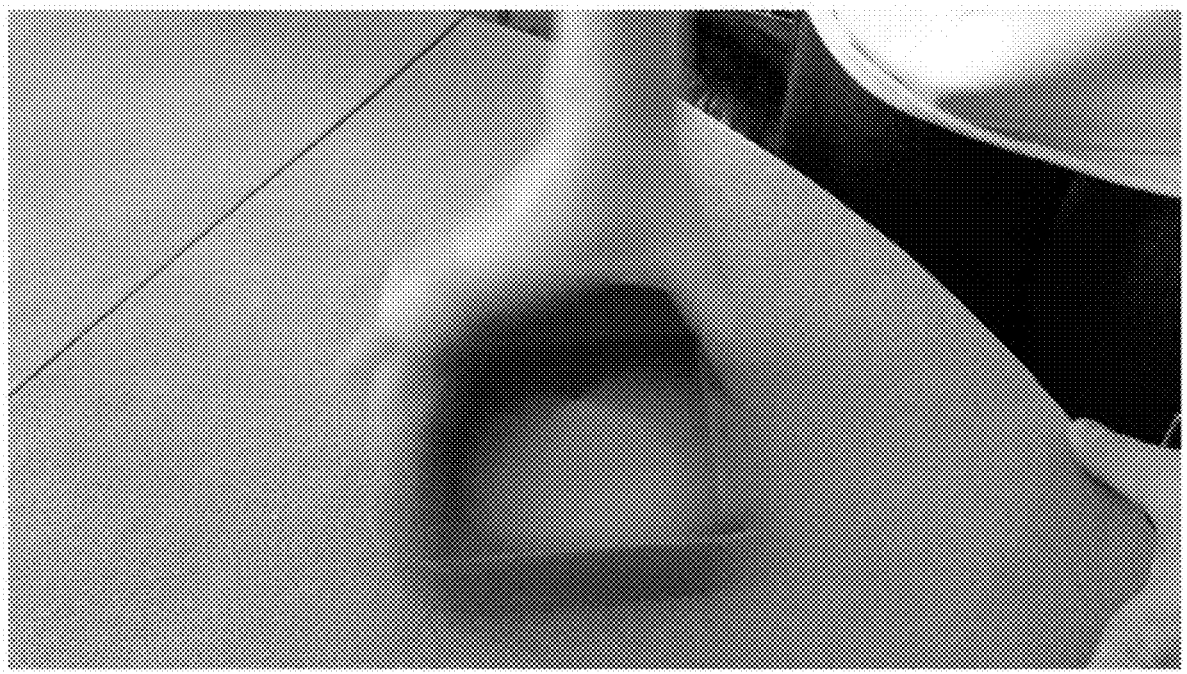
Figure 2A:
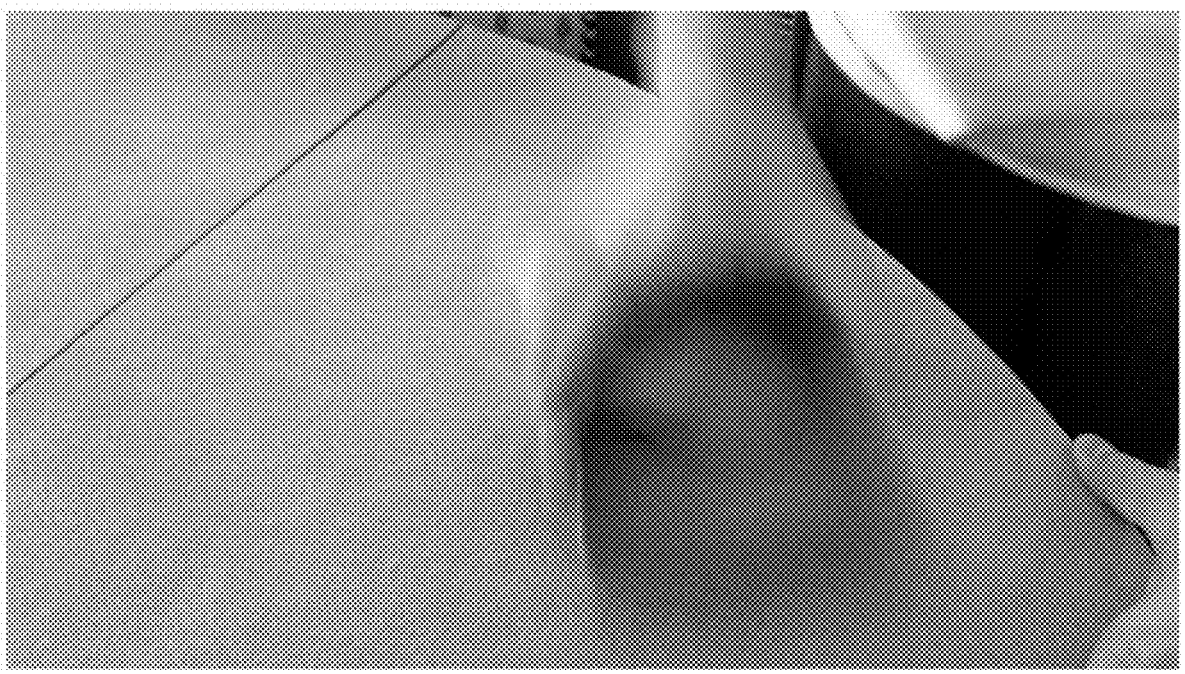
Figure 2B:
Figure 2C:
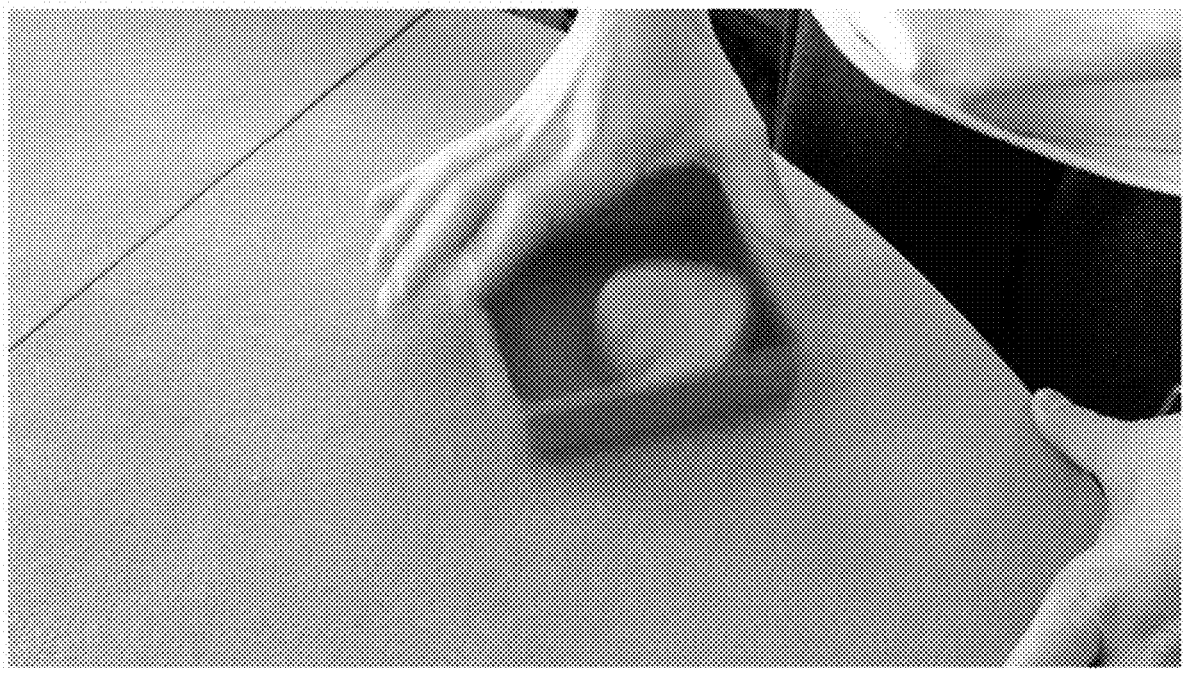
Figure 2D:
Figure 2E:
Figure 2F:
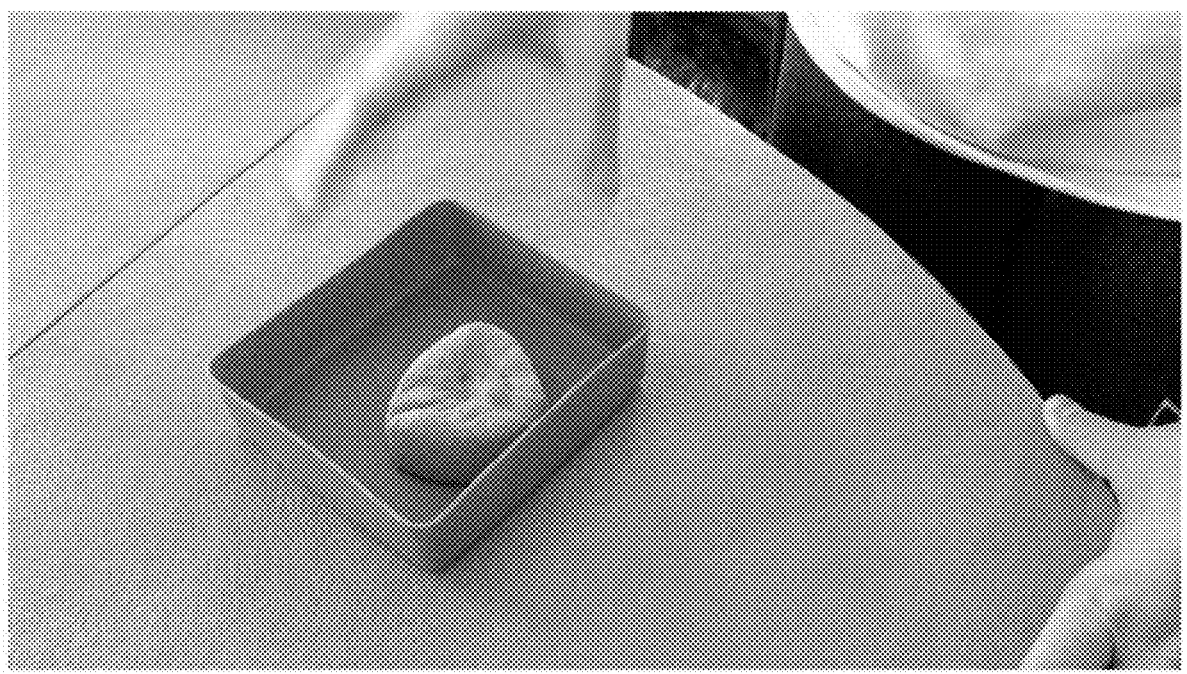
Figure 2G:
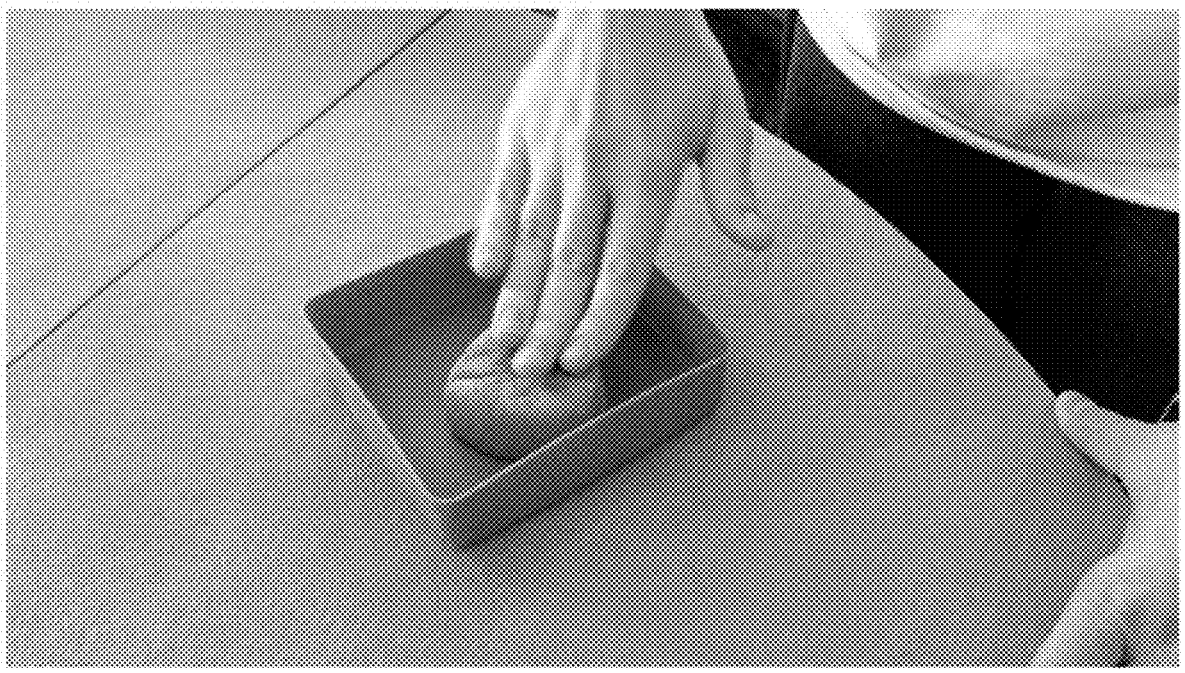
Figure 2H:
Figure 2I:
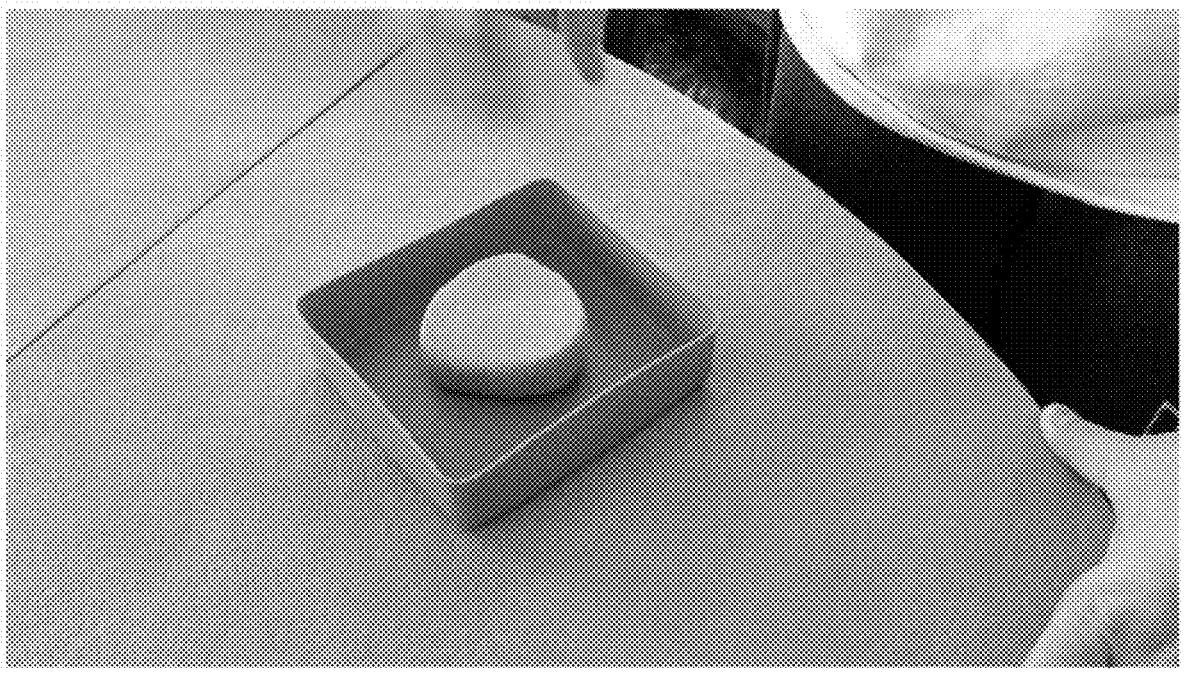
Figure 2J:
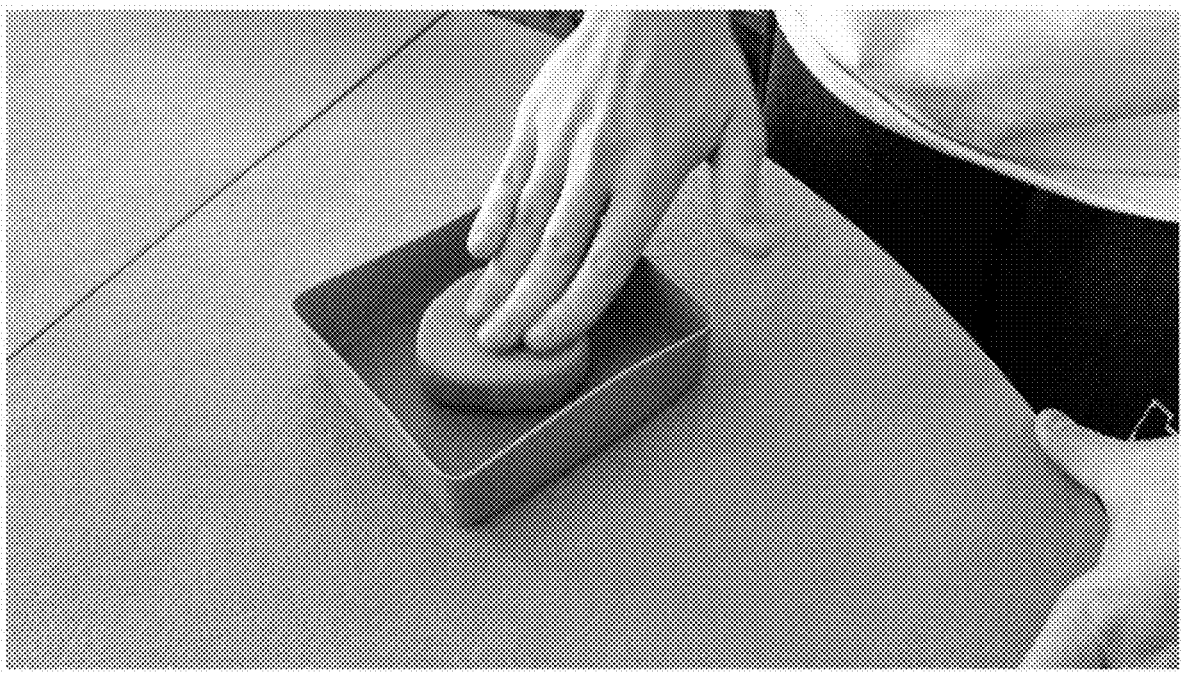
Figure 2K:
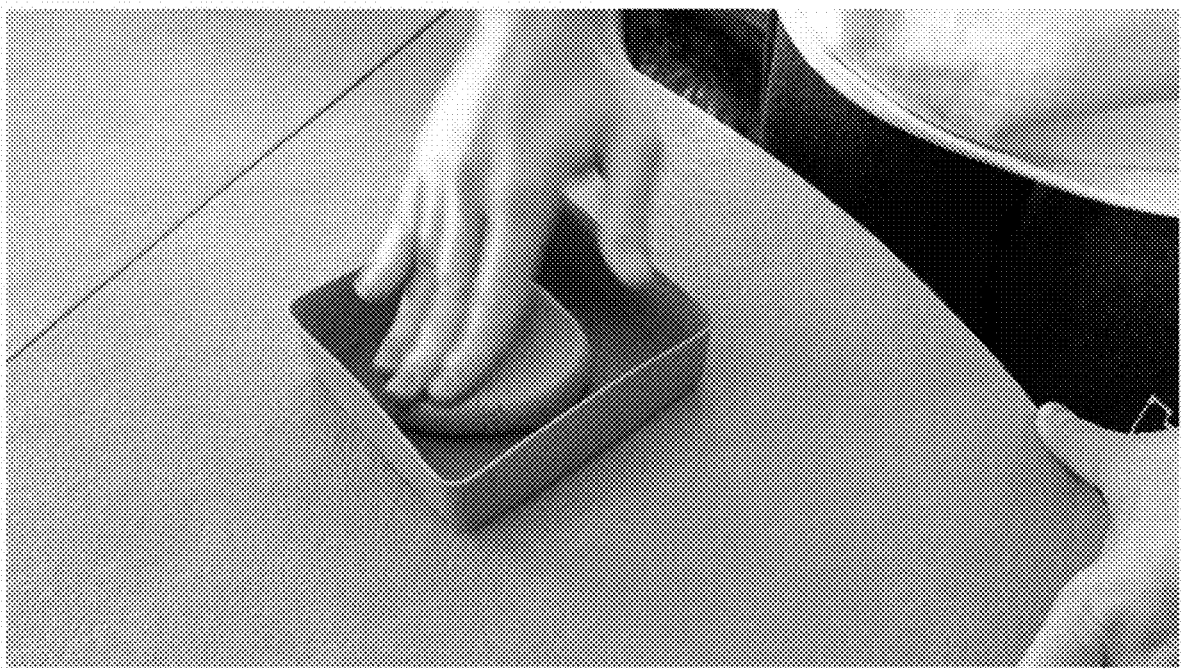
Figure 2L:
Figure 2M:
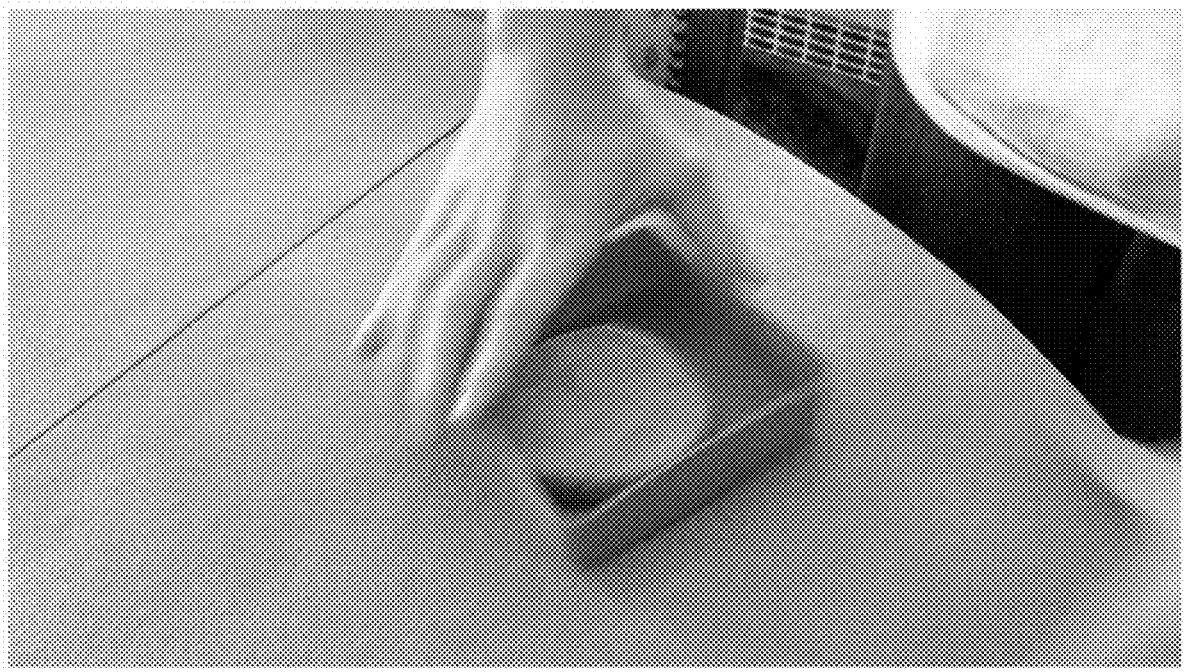
Figure 2N:
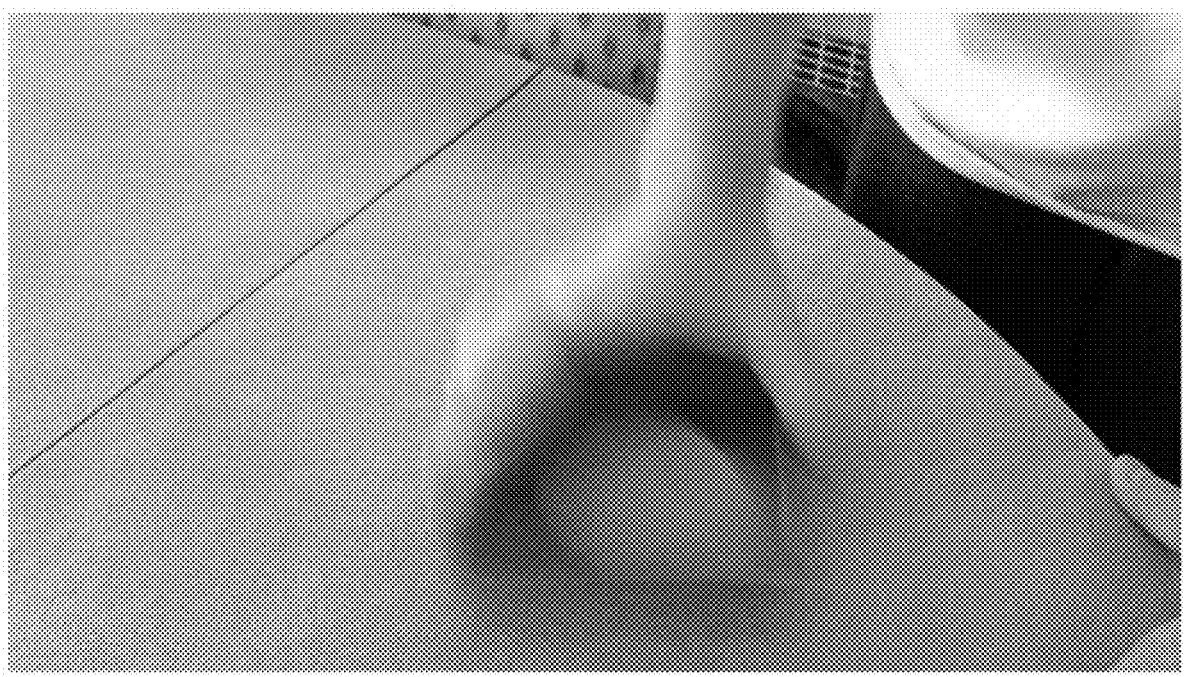
Figure 2O:
Figure 2P:
Figure 2Q:
Figure 2R:
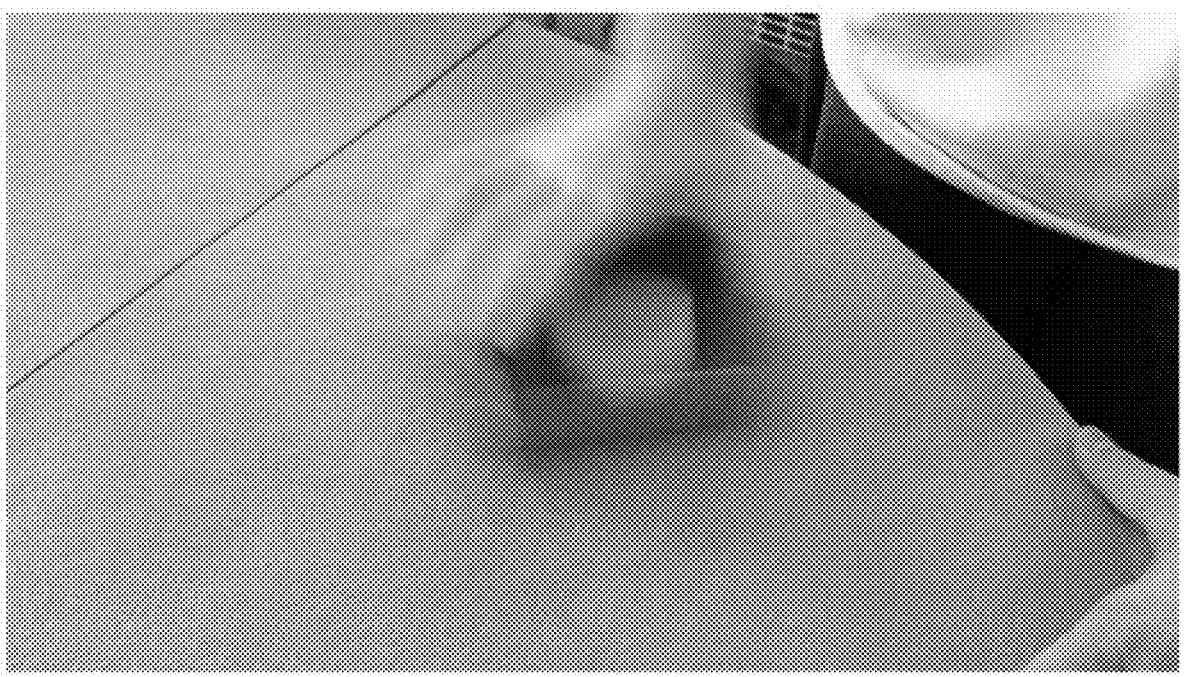
Figure 2S:
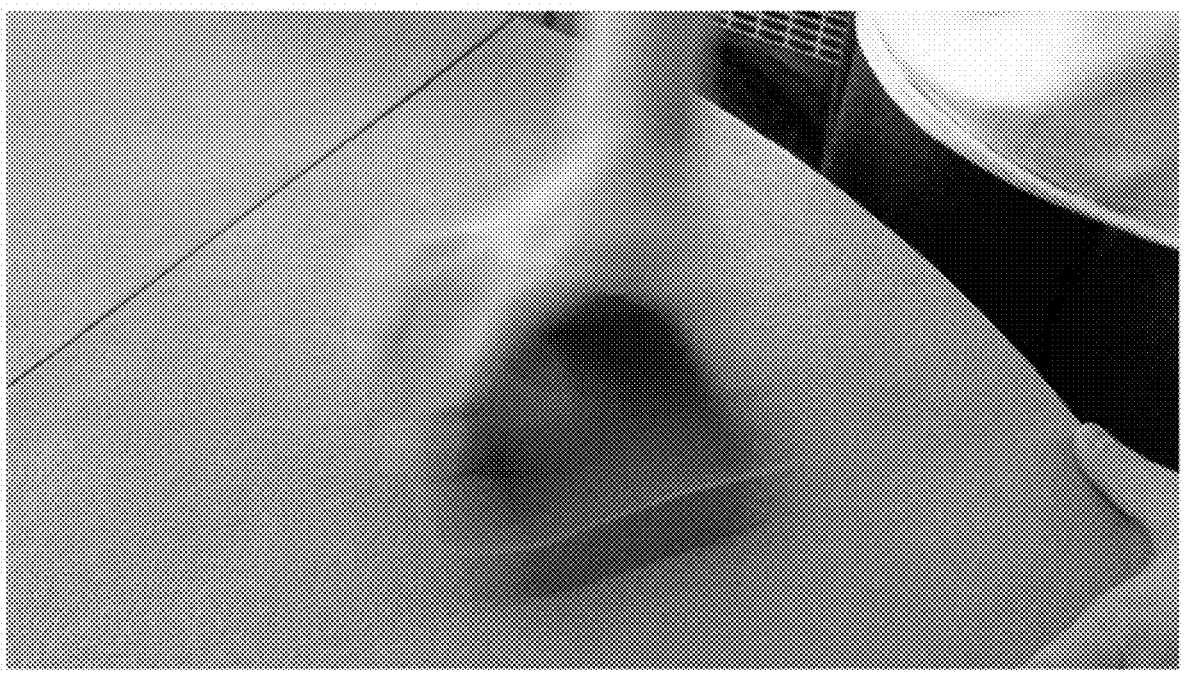
Figure 2T:
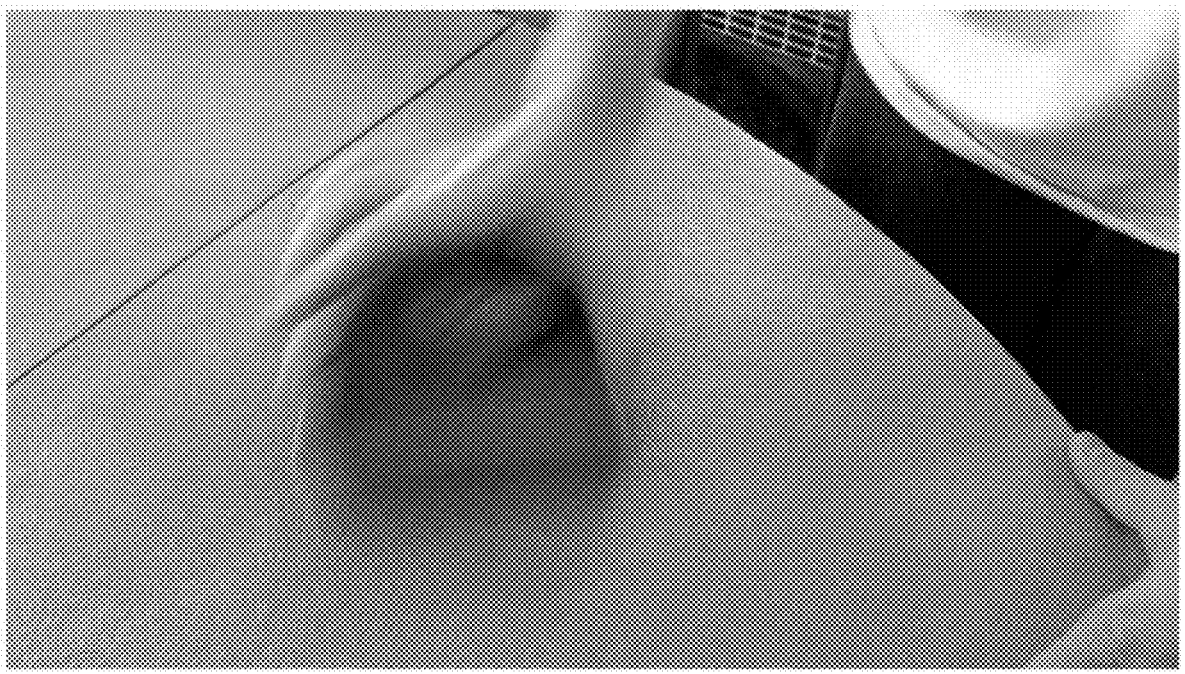
Figure 2U:
Figure 2V:
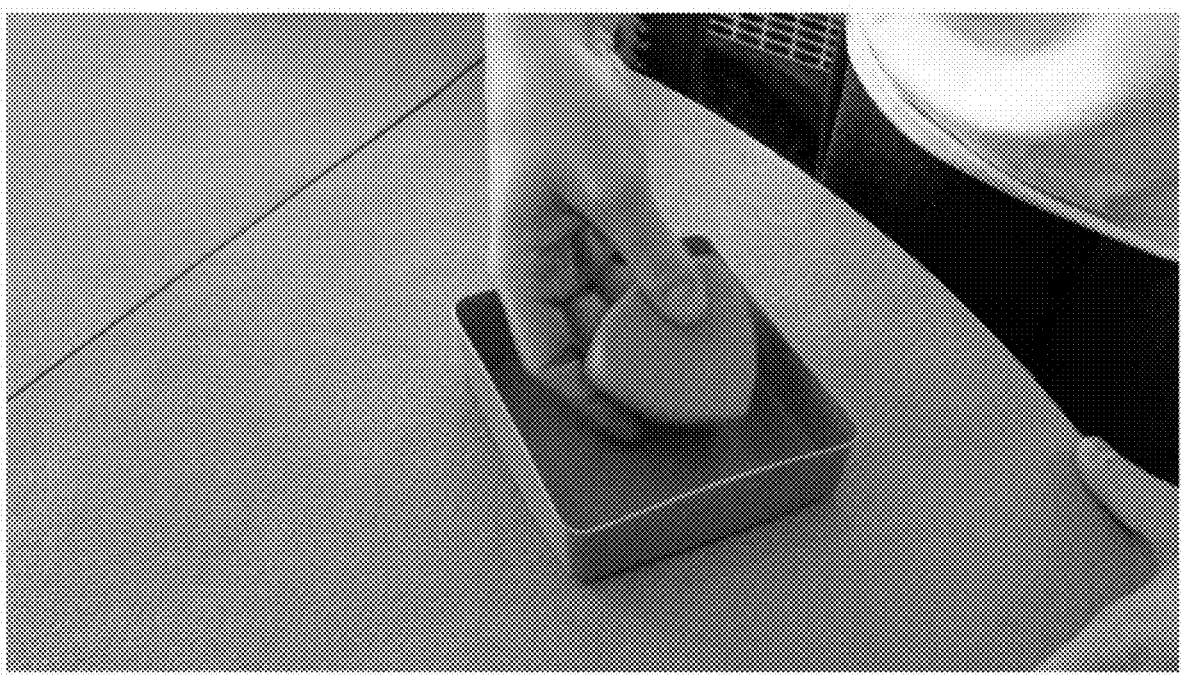
Figure 2W:
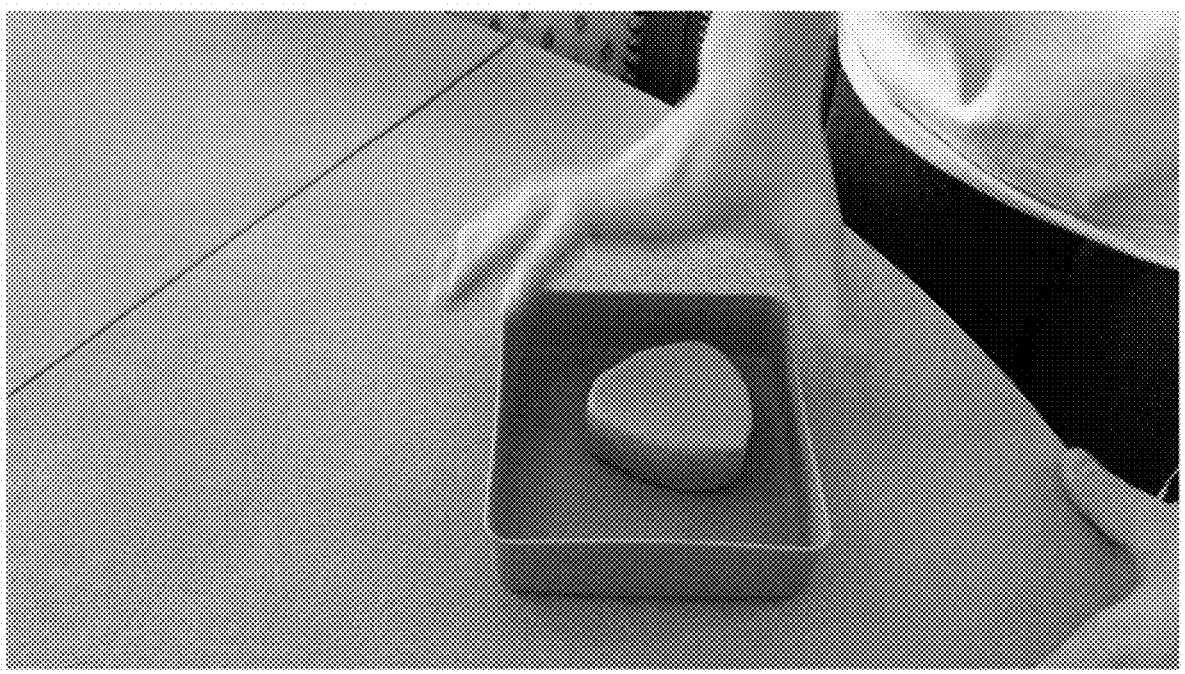
Figure 2X:
Figure 2Y:
Figure 2Z:
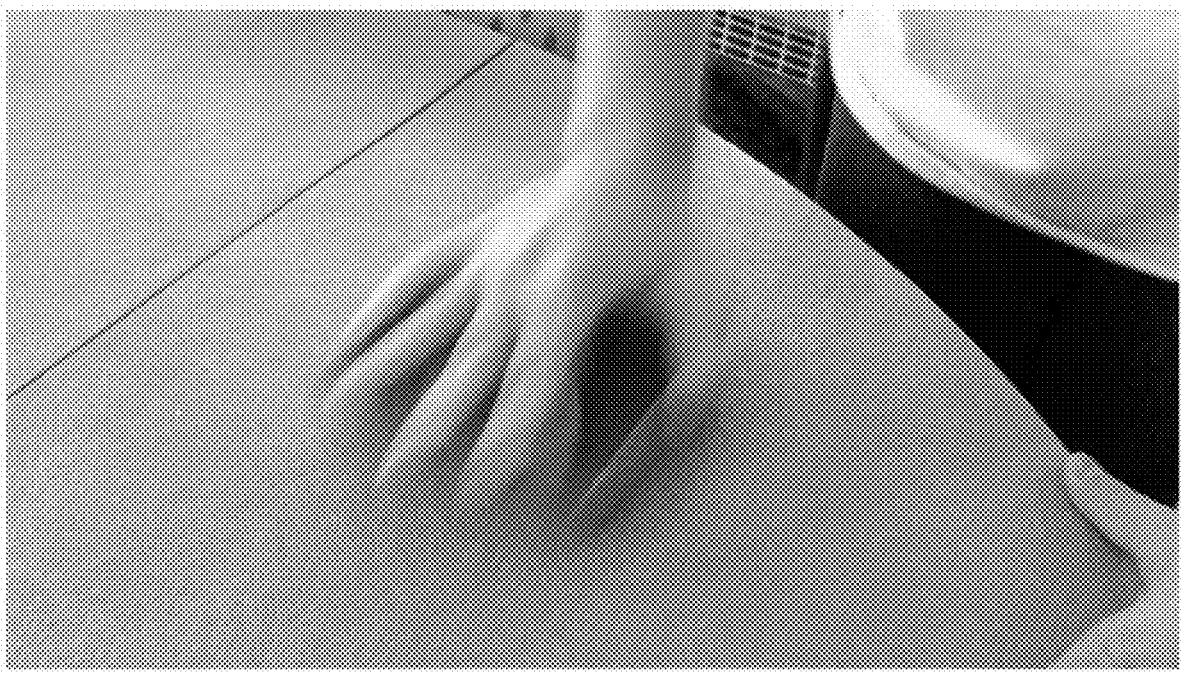

FIGS. 2A-2PPP show a method for making a Reuleaux triangle 11 according to an embodiment of the present invention, with the various figures being taken at approximately one second intervals. First the 98% high quality sand and 2% silicone raw material 10 are formed into an approximately circular "patty" shape, by forming the material 10 into an approximately spherical shape and then flattening it into a patty. Then the container 20 is rotated around an orbit, for example, approximately six times. Then the raw material 10 is flattened more. Then the container 20 is rotated, for example approximately twenty-three more times. Then the raw material 10 is flattened more, and then flipped over, and then flattened more. Then the container 20 is rotated, for example approximately twenty-five more times. Then the raw material 10 is flipped over. Then the container 20 is rotated, for example approximately thirteen more times. Then the raw material 10 is flipped over. Then the container 20 is rotated, for example approximately fifteen more times. Then the raw material 10 is flipped over. The result is a Reuleaux triangle 11. The numbers of rotations recited above are merely illustrative and a person of ordinary skill in the art would understand that different numbers may be used to achieve the same results.

Figure 3A:
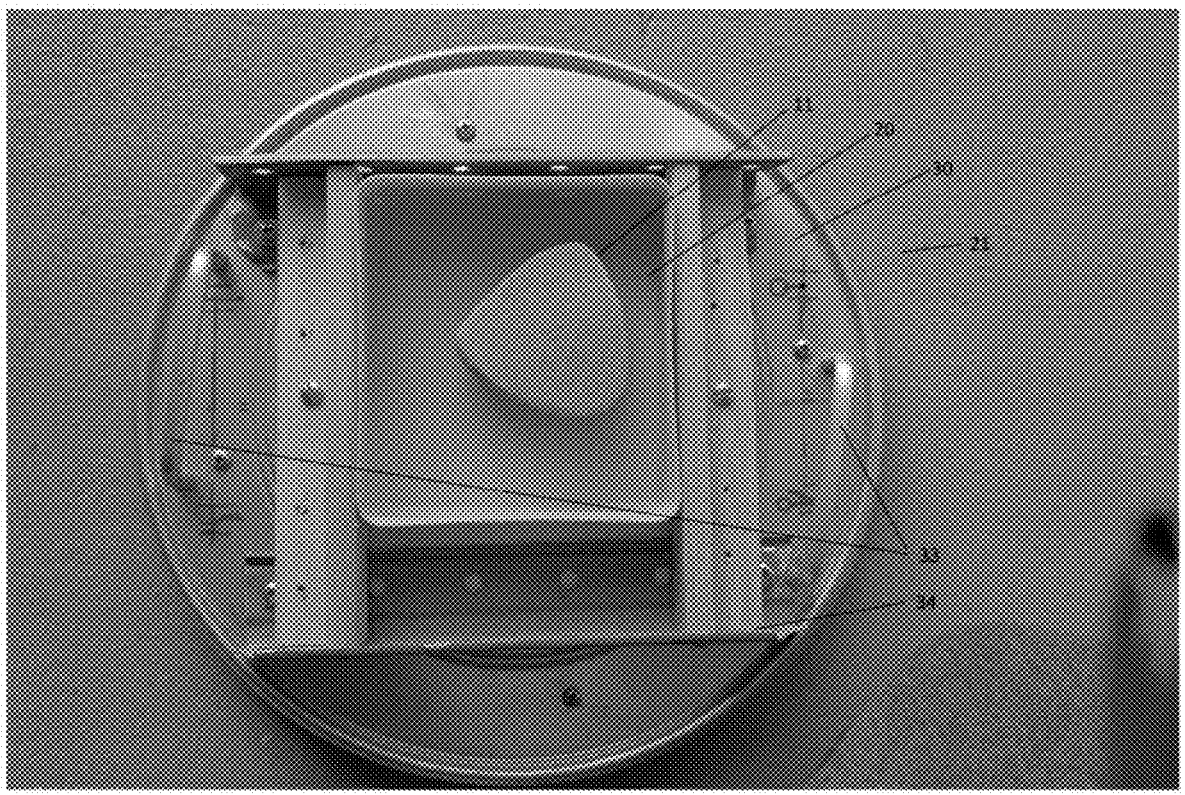
FIGS. 3A and 3B show top and bottom views of a platter and a Reuleaux triangle according to one embodiment of the present invention.
Figure 3B:
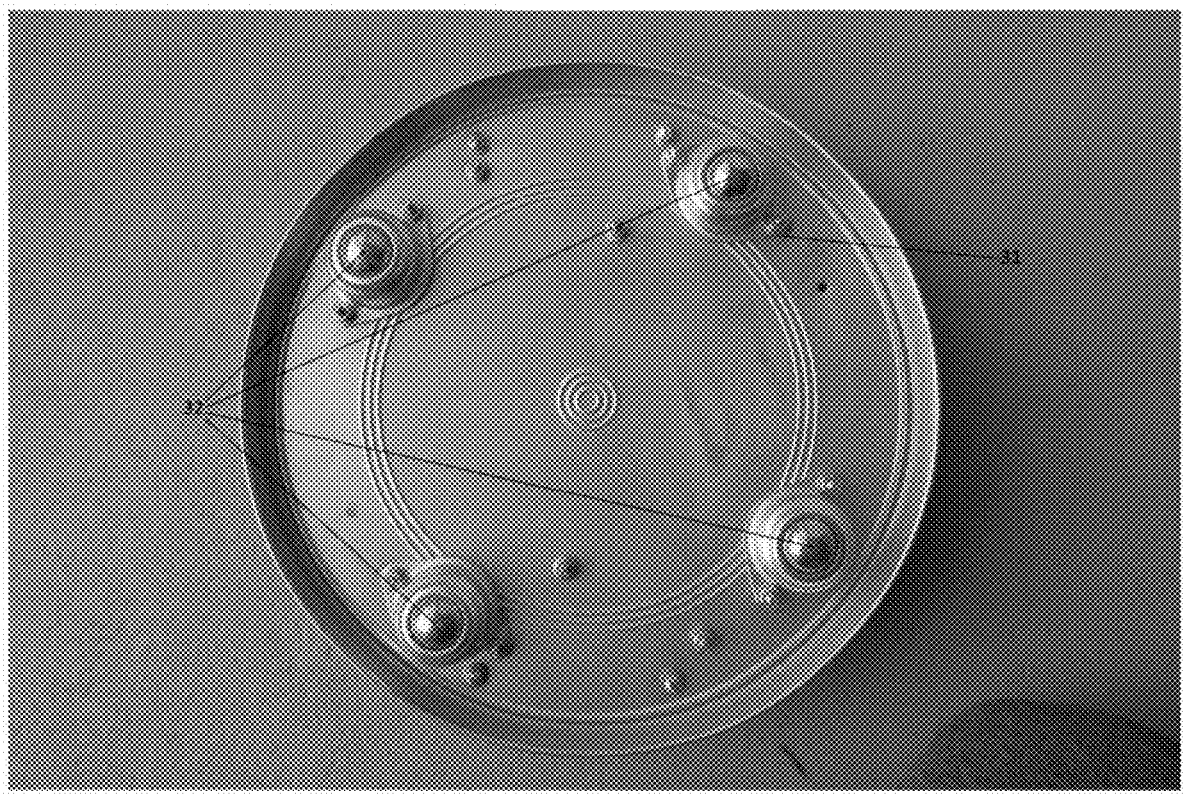

In certain embodiments, including the one shown in top and bottom view in FIG. 3A and FIG. 3B, respectively, a platter 30 is mounted on a wheel 31. The platter may be large, and it may be rigid. The wheel may be ball-bearing 32 like, and it may be able to rotate in any direction. It may do so without favoring either direction. A mount 34 may be affixed to the platter. The mount 34 may be adjustable, and it may be able to receive different size containers 20. Handles 33 may be added. The wheel 31 is used to spin the platter 30 and container 20, which container 20 contains the material 10. This may be done on a flat surface 21. The flat surface 21 may be a workbench, an extremely flat sheet of Corian, a concrete floor, or another flat surface as will be understood to one of ordinary skill in the art.

Adjustments to these embodiments may be made when they are being operated by different operators. Different shapes of track may be attached to the workbench. These shapes may be circles, squares, or squares with rounded corners, all of different widths. The track may guide the orbits of the movement. A vertical rod may be attached to the platter 30 or to the wheel 31, to allow the track to guide the movement of the platter 30.

In another embodiment, a cup-like attachment is mounted under the platter 30 or wheel 31. A vertical rod may be attached to the table, and may be used to guide the movement. Or, in addition to or in place of the vertical rod, any of various shapes may be used to guide this cup-like attachment. These various shapes may be cut from plywood. The plywood may be a 1" sheet of plywood. These various shapes may be squares, discs, or ovals, or other shapes capable of guiding the orbit. These various shapes may be small. They may range from 2 cm to 7 cm in diameter.

The container 20, or the platter 30, is slid over the tray or plane 21. The orbit of the sliding motion may approximate a chosen shape. The shape may be circular, or a square. In an embodiment, the orbit is a hybrid shape that is generally square but with rounded edges, in another embodiment, the orbit is close to a circle, but with compressed sides. The compressed sides may be located on one or more or all of the following sides: left, right, top, and bottom. In further embodiments, the orbit may be of any shape represented along the continuum of a square morphing into a circle as the rounded corners get larger and larger.

In certain embodiments, the orbit can be an ellipse or an oval. In other embodiments, it may be two ellipses stacked (that is, put together), or two ovals stacked, each one very close to a circle, one being elongated front to back, and the other elongated right to left. The orbit may be concave.

In various embodiments, the orbit is in a horizontal plane. For example, all of the above-described orbits may be in a horizontal plane.

In certain embodiments, the container is translated but moved without rotation. The container may be slid alternating between clockwise and counterclockwise.

In this two-dimensional plane, the translation may go right to left and left to right, back to front and front to back. Thus, in certain embodiments, the container 20, and the raw material 10, are not experiencing any rotation. Stated differently, the angle of rotation of the container 20 and its contents in such embodiments is zero degrees.

To visualize this, consider a Ferris wheel. The X axis goes left to right, the Y axis goes up and down, and the Z axis goes front to back. In its usual, vertical position, there is no movement in the Z axis. The wheel and all the spokes experience a 360 degree rotation in the X/Y plane. The baskets only experience a translation in the X/Y plane, without a rotation. While all their points go through a change of their X/Y coordinates, their relative position remains the same. Thus the highest part of the basket remains in the top-most relative position, with the same applying to the bottom-most, left-most and right-most points, and more generally to all the points.

Now let us flip the Ferris wheel 90 degrees back. It is now flat in the X/Z plane. There is no movement in the Y axis. The wheel and the spokes experience a rotation in the X/Z plane. But the baskets do not rotate, and only experiences a translation in the X/Z plane, left to right, and front to back And analogous to any basket, of the Ferris wheel, the container 20, in certain embodiments of the invention, experiences a horizontal rotation of zero degrees, and two types of translations (front-back and left-right).

In an alternate embodiment, a container without a bottom is instead rotated in the vertical plane.

The shape of the container 20 which can generate, and has generated, a three-sided Reuleaux 11 according to an embodiment of the invention is a quadrilateral. This three-sided Reuleaux may be in the shape of a tube with a Reuleaux section, rather than a disk. In a further embodiment the container shape is a rectangle, in a further embodiment it is a square.

The shape of the container which can generate, and has generated, a five-sided Reuleaux according to a different embodiment of the invention is a six-sided container (a Hexagon). In certain embodiments, the hexagon is a regular hexagon.

The shape of the container 20 which can generate an n-sided Reuleaux (where n is any odd counting number greater than or equal to three, for example, three, five, seven, nine, eleven, thirteen, fifteen, and so on . . . ) according to further embodiments of the invention is an (n+1)-sided container (an even number, for example, four, six, eight, ten, twelve, fourteen, sixteen, and so on . . . ). In certain of these embodiments, the (n+1)-sided container is a container in the shape of a regular (n+1)-sided polygon.

In certain embodiments, the success rate of forming Reuleaux shapes, and in particular Reuleaux triangles, and the speed of forming such shapes is increased by selecting an ideal quantity of raw material for a given size of container. These metrics can also be increased by selecting a container that is not too large, and not too small, in one embodiment, the container is approximately 10 cm square and 5 cm high, with interior dimensions approximately 9.5 cm by 9.5 cm, and the amount of material is approximately a half-cup, or between a quarter of a cup and three quarters of a cup.

The amount of raw material 10 used affects the thickness and/or size of the Reuleaux shape, as can the speed of the rotation employed. If an excess of material is used, a disk may be produced rather than a Reuleaux shape.

In certain embodiments, the closeness of the initial raw material shape used to a perfectly circular "patty" is determined by the number of sides to the Reuleaux shape intended to be created. Thus, when creating a Reuleaux triangle 11, the initial raw material shape used may not be of great importance, and, in certain embodiments, need not closely approximate a circular patty. However, when creating a Reuleaux shape with more sides, the initial raw material shape used may more closely approximate a perfectly circular "patty". Using such a shape for the initial raw material 10 may help in the creation of the many-sided Reuleaux, as Reuleaux shapes with more sides will more closely approximate a circle.

In some embodiments, the diameter of the orbit of the container 20 is selected to be approximately, or just a bit less than, two times the width of the container 20. In certain embodiments, this diameter of the orbit of the container is selected to be between one and two times the width of the container, in some embodiments, the speed of the rotation is selected such that it is fast enough for a Reuleaux shape 11 to form. In some embodiments, the sharpness of the outline of the Reuleaux shape 11 is increased by increasing the speed of the rotation of the container 20. In some embodiments, the rotation of the container is mechanized, using such mechanisms as are known in the art.

Preferred weights of raw material 10, which give rise to particular curve widths and thickness/heights for the resulting Reuleaux triangle 11 can be derived from the below testing chart, by one of skill in the art, it being understood that the container used was 10 cm square and 5 cm high, with inferior dimensions of 9.5 cm×9.5 cm, and that sample number 5 resulted in the best shape:

| Sample no. | weight | curve width* | thickness/height |
|---|---|---|---|
| 1 | 86 g | 5 cm | 2.5 cm |
| 2 | 70 g | 4.5 cm | 2 cm |
| 3 | 60 g | 4.5 cm | 1.75 cm |
| 4 | 52 g | 4 cm | 2 cm |
| 5 | 40 g | 4 cm | 1.5 cm |
| 6 | 30 g | 3.75 cm | 1.2 cm |

*the Reuleaux triangle resembles an equilateral triangle shaped balloon that has been overinflated.

The altitude of an equilateral triangle is the line that starts at one tip, and bisects the opposite side at a 90 degree angle. Such a triangle with 3×10 cm sides has an altitude "A"=S×(√3)/2 or 10×0.866=8.66 cm.

A remarkable characteristic of a Reuleaux triangle is that the Altitude is equal to the side. A"="S". In this example, "S"="A"=10 cm.

After the Reuleaux shape is formed it may be removed from the container.

Figure 4:
FIG. 4 shows the results of baking a Reuleaux triangle formed according to embodiments of the present invention.
Figure 5A:
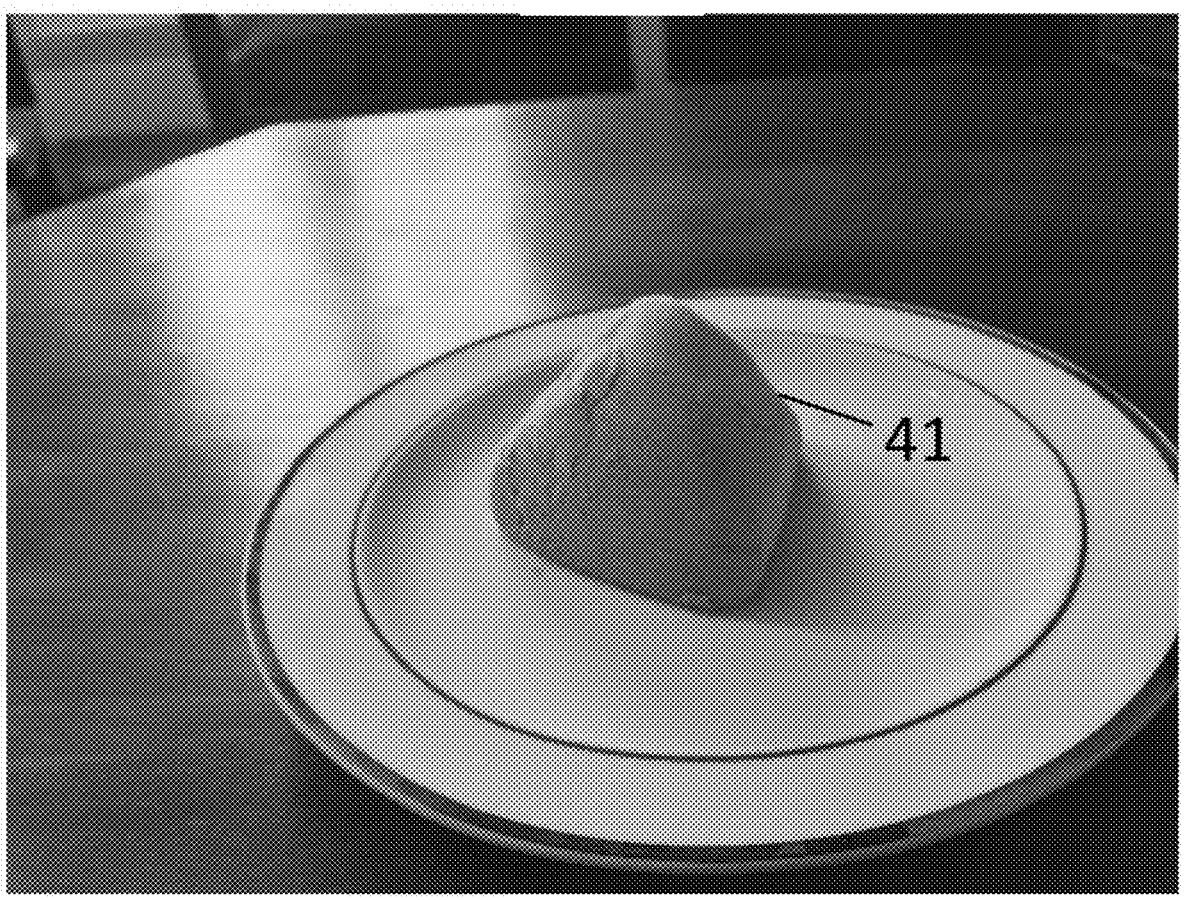
FIGS. 5A-5H shows various views of two 3-dimensional Reuleaux shapes made according to another embodiment of the present invention, with FIGS. 5A-5E showing a first 3-dimensional Reuleaux shape and FIGS. 5F-5H showing a second 3-dimensional Reuleaux shape.
Figure 5B:
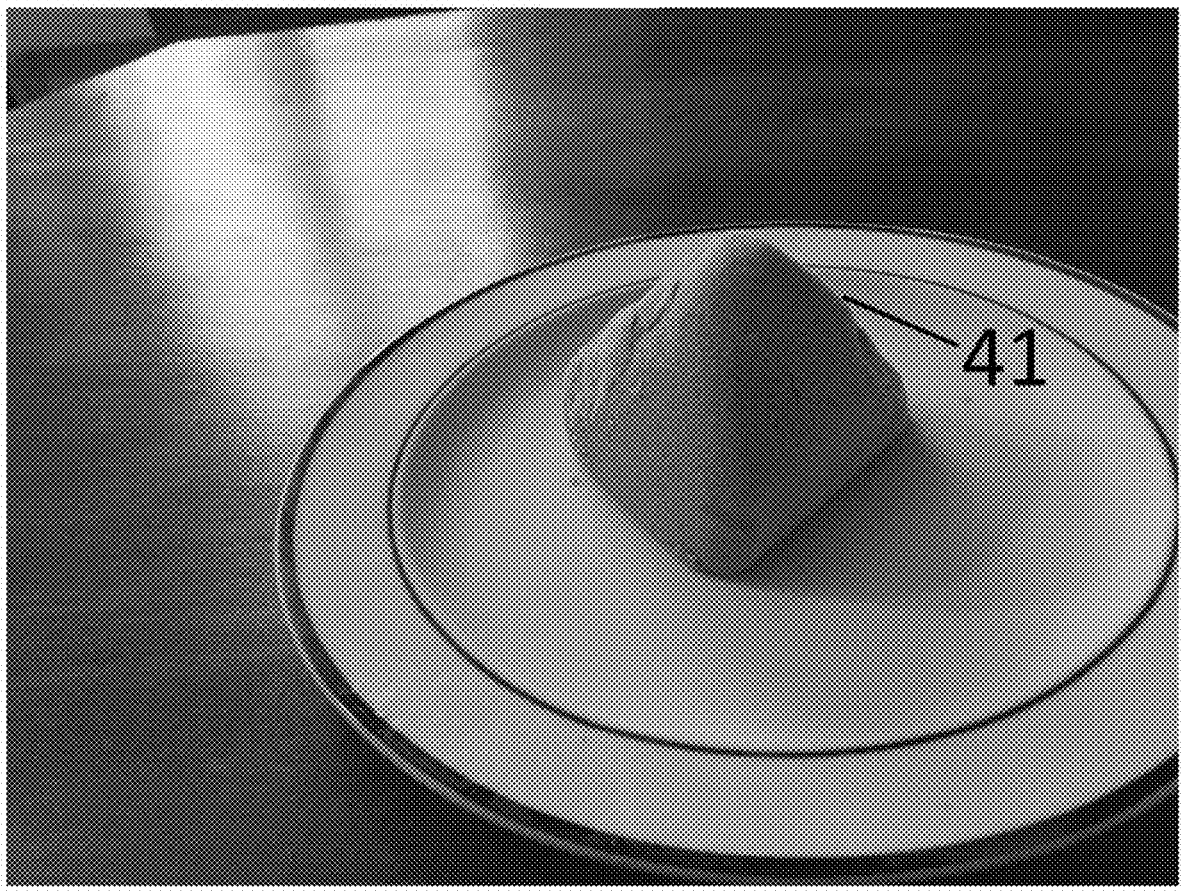
Figure 5C:
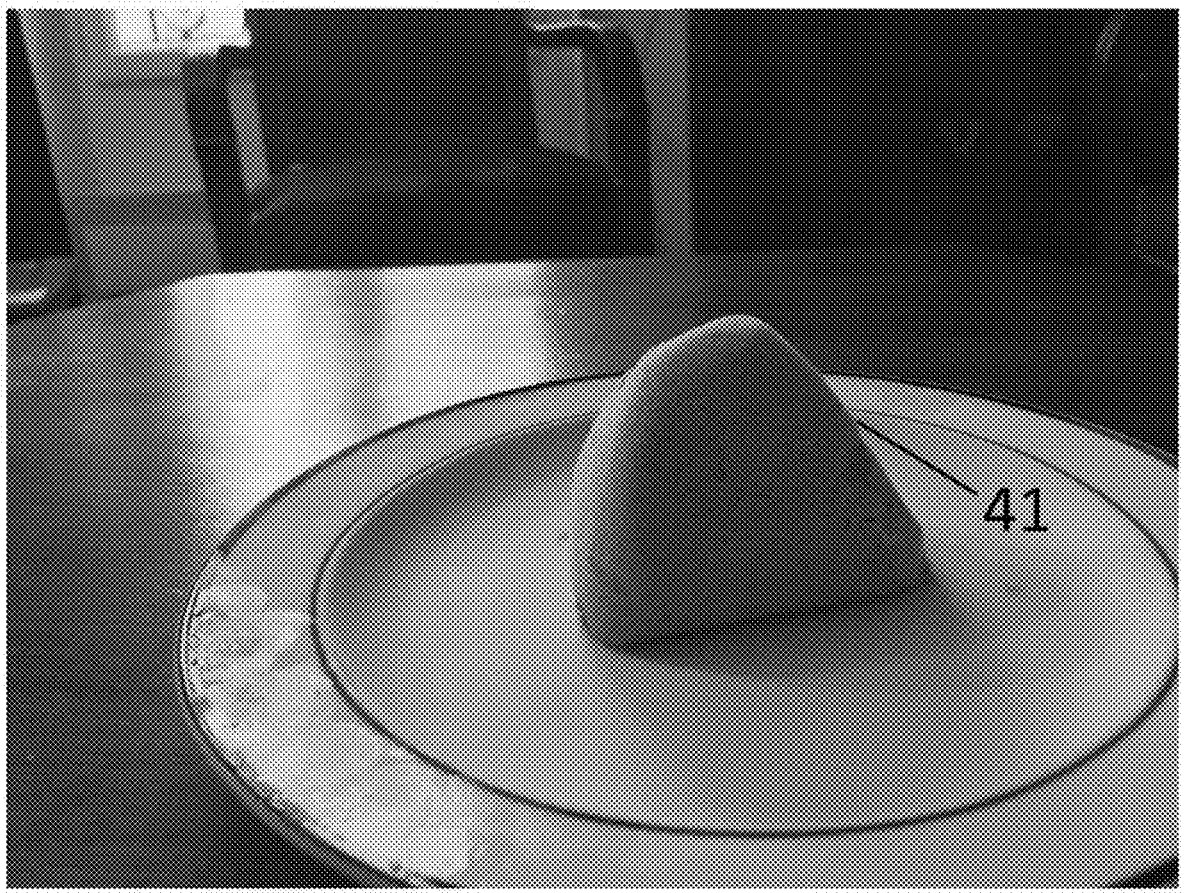
Figure 5D:
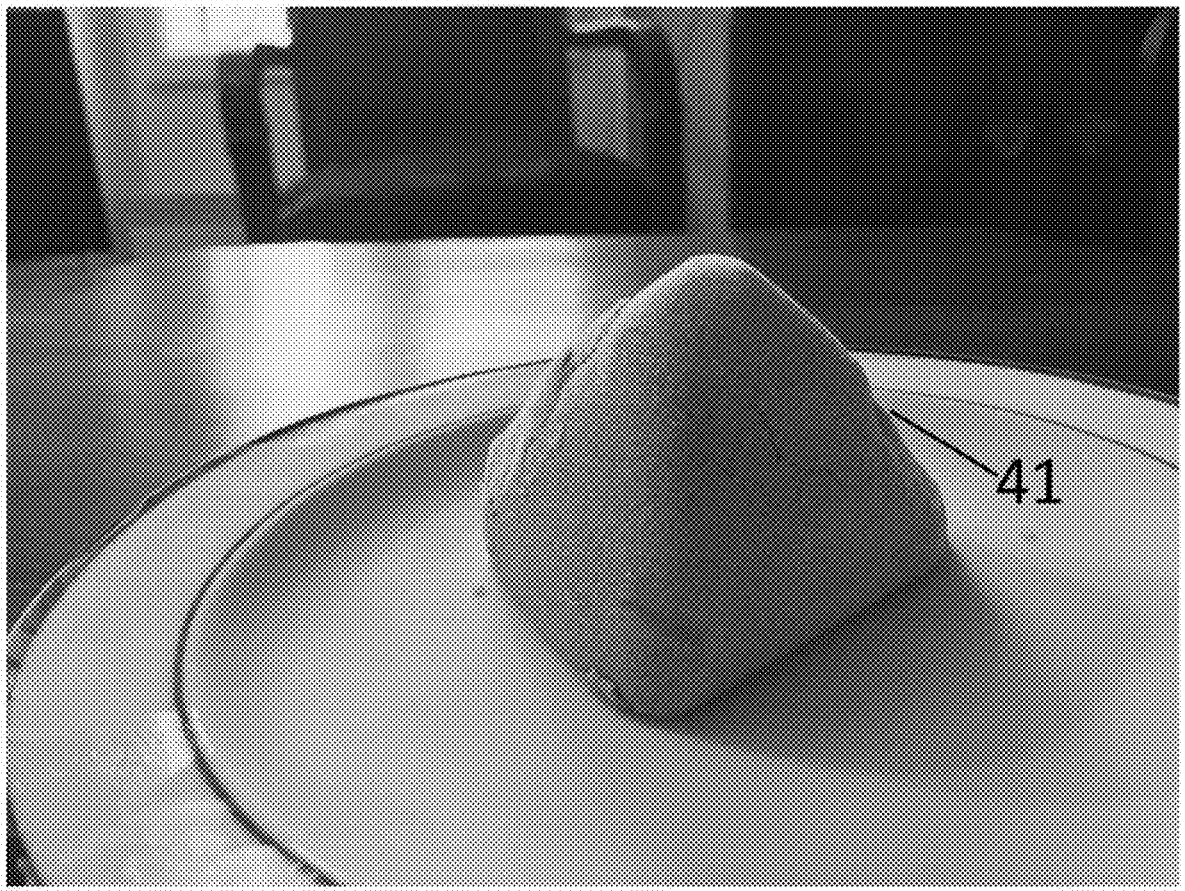
Figure 5E:
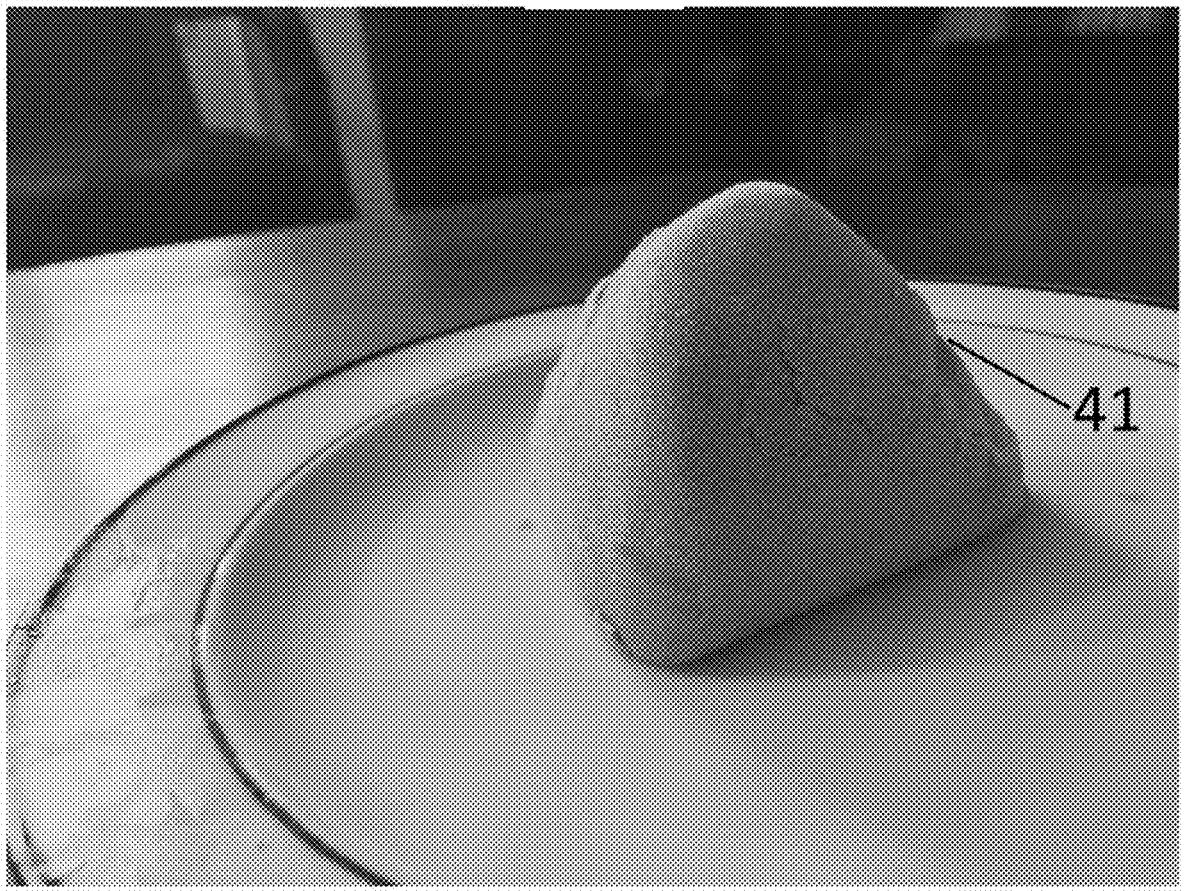
Figure 5F:
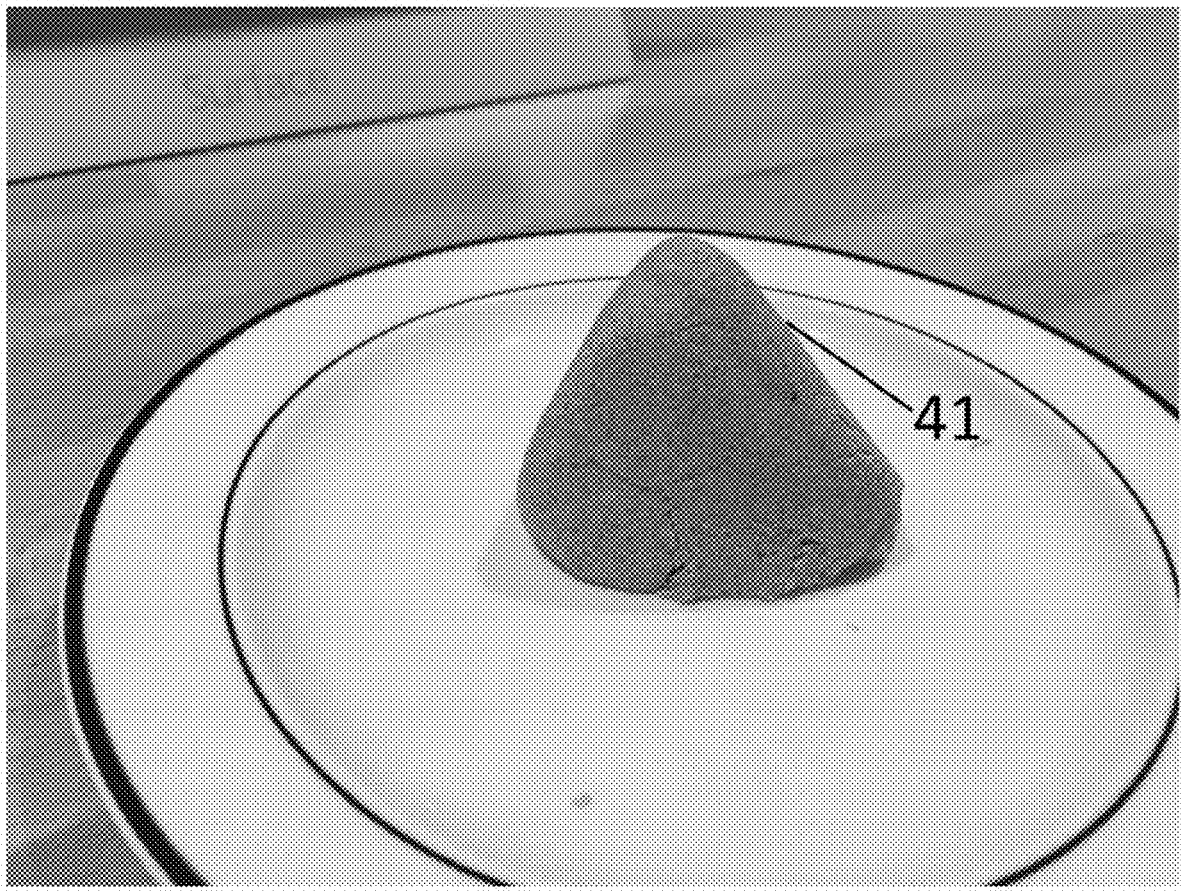
Figure 5G:
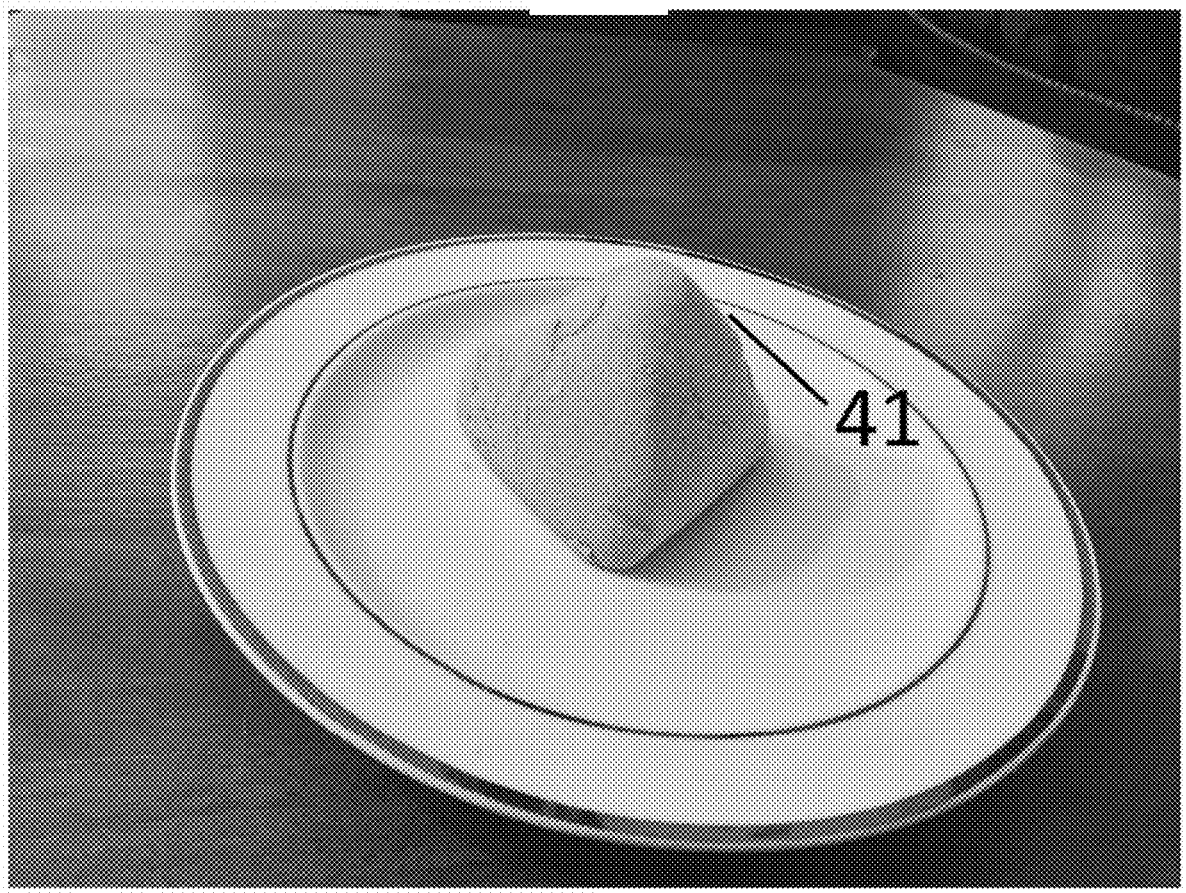
Figure 5H:
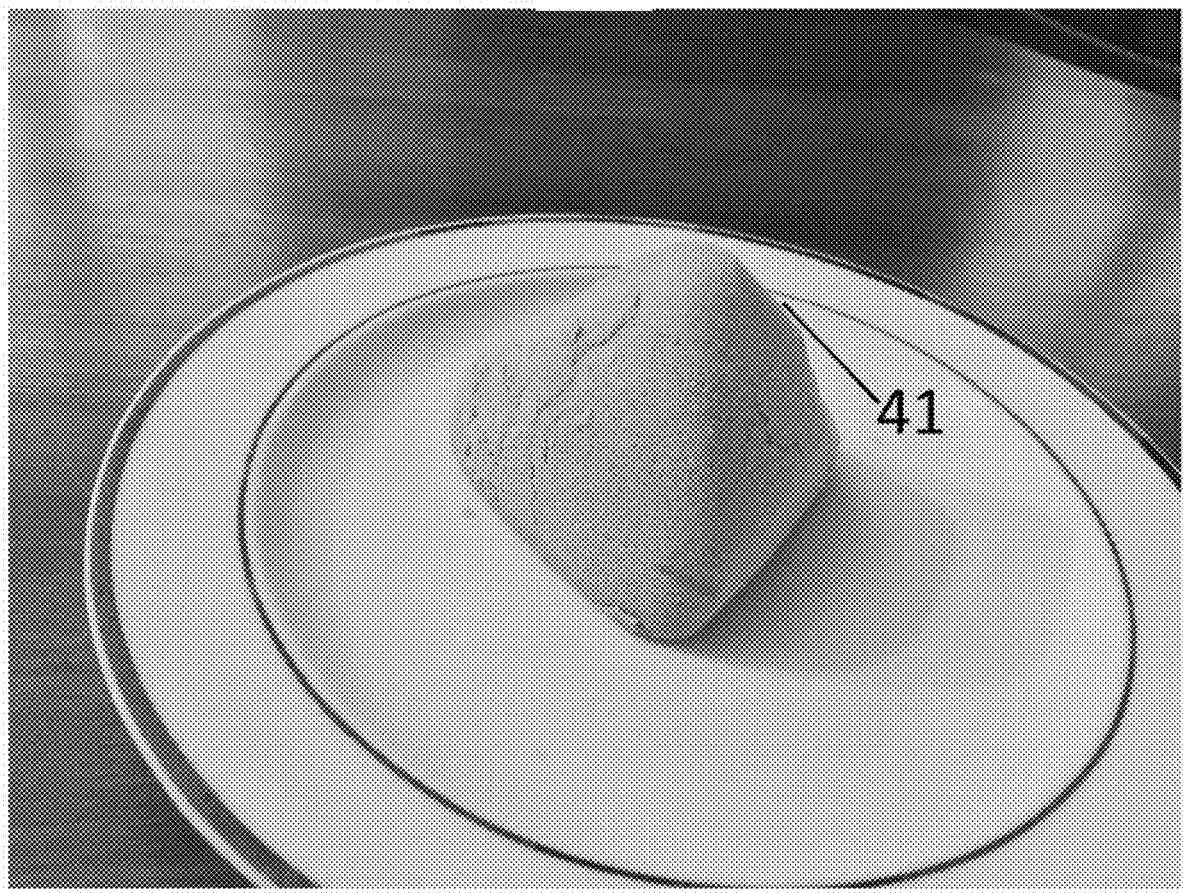

In a further embodiment, for hardening and preservation purposes, after the Reuleaux polygon 11 is formed from the material 10, the Reuleaux polygon 11 may be frozen, and then baked. The freezing may occur for 48 hours, or for at least 48 hours. Where smaller amounts of material are being frozen, the freezing may occur for a shorter period of time. The baking may occur in a toaster oven, or in any other device capable of providing high levels of heat for a long period of time. The temperature may be at approximately 270 degrees Celsius. The time may be approximately four hours. However, other temperatures may be used, for example, 250-290 degrees Celsius. Other times may be used, for example, three to five hours. Baking a single Reuleaux shape alone may be performed, so as to provide a uniform temperature all around the Reuleaux shape. Baking for a longer period of time may result in the color of the material becoming a dark grey, giving it a burned look. The baking temperature, for additional precision, may be measured using such more precise temperature-measuring devices as are known to those of ordinary skill in the art, such as the temperature-measuring devices manufactured by Raytech. Baking may result in the burning off, or conversion to a non-active form, of PDMS, in the event that is in the material. As shown in FIG. 4, the results of freezing and then baking (right) are far superior to baking alone (left), in an embodiment, the particular material 10 used in the freezing and baking process is formed from a mixture of sand and silicone. In a further embodiment, the sand may be high grade sand, in yet a further embodiment the proportions may be approximately 98% sand or high grade sand and approximately 2% silicone. In a further embodiment, the raw material may be kept at room temperature prior to freezing. In yet a further embodiment, the raw material may be kept at a medium humidity prior to freezing, in one embodiment, the humidity is between 40% and 70%. In certain embodiments, the freezing and banking process is applied to WABA Fun. LLC's Kinetic Sand product, or another material which is 98% pure sand.

In another embodiment of the present invention, materials as described in the preceding paragraph, for hardening and preservation purposes, may be frozen, and then baked, regardless of its precise shape.

In another embodiment, the shape of these materials, whether or not in a Reuleaux shape, may be preserved by freezing (as described above), and then coating with polyurethane. The polyurethane may be applied as a spray. Alternately, after freezing, a mixture of wood glue and water can be applied. Alternately, after freezing, a very fluid type of epoxy, sufficient to infuse through the voids between sand particles in the material, may be used. For example, cyanoacrylates, which are used in such products as KRAZY GLUE® brand adhesives, may be used.

In a further embodiment of the present invention, pretreating of the material, prior to the moving of the container, may occur. For example, the material pre-treating may involve-heating the material at a low temperature, for example approximately 100 degrees Celsius (or between 70 and 130 degrees Celsius, for a short period of time, for example approximately 10 minutes (or between 5 and 15 minutes).

Figure 6A:
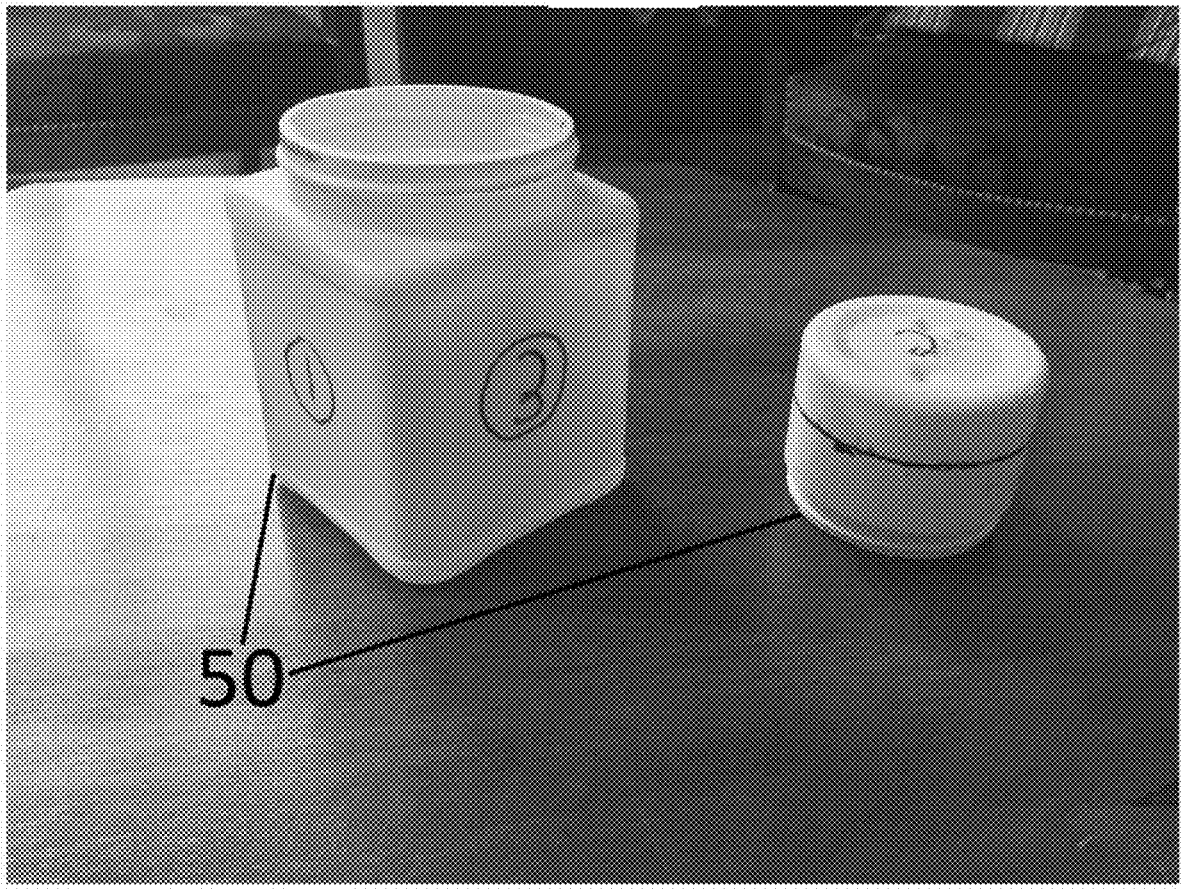
FIGS. 6A-6C show various views of an approximately cubic container which may be used to create a 3-dimensional Reuleaux shape, as shown in FIGS. 5A-5H.
Figure 6B:
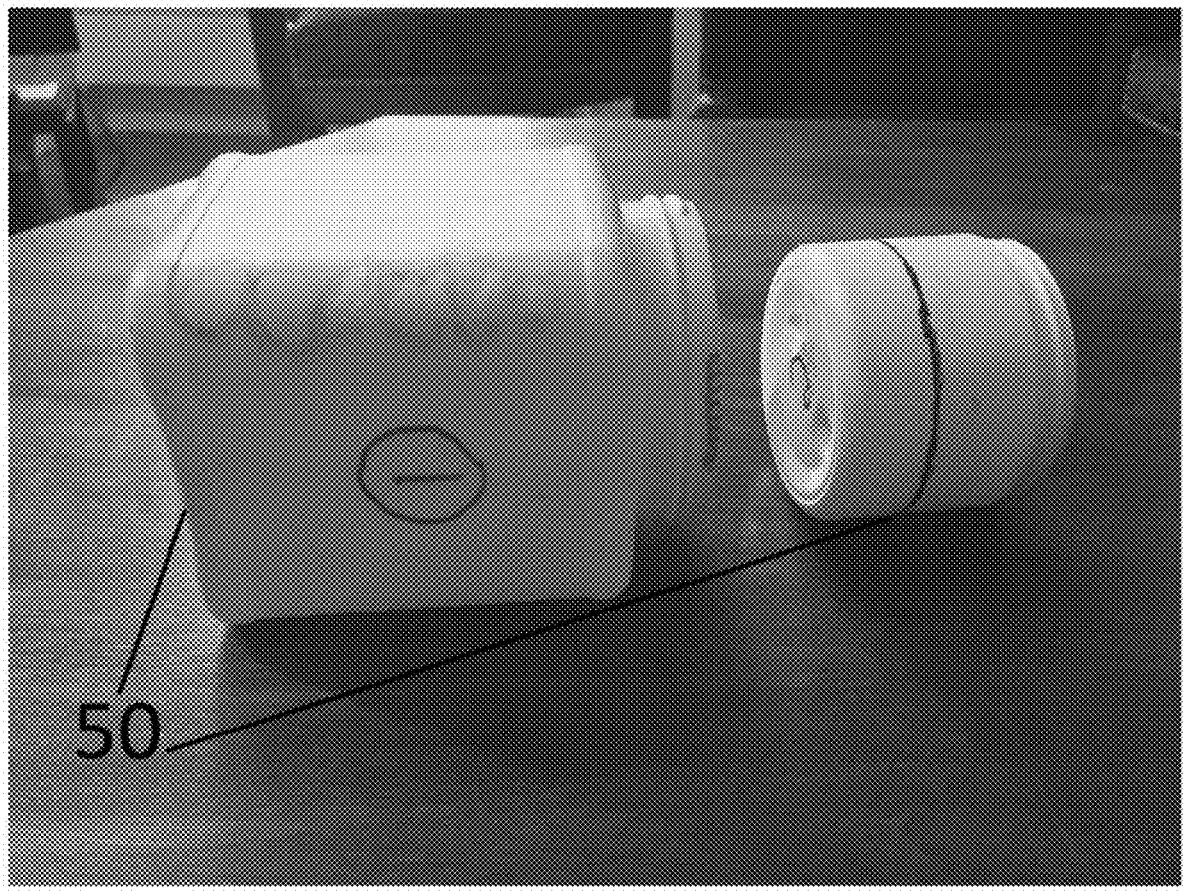
Figure 6C:

3-dimensional Reuleaux shapes 41 may also be formed according to embodiments of the present invention. An approximately cube-shaped container 50, such as is shown in FIGS. 6A-6C may be used. The cube-shaped container 50 may have rounded corners. All of the edges of the cube-shaped container 50 should have approximately equal length. To ensure a standardized cube is used, the faces of the cube-shaped container 50 may be numbered so that the sum of the marks of two parallel sides that face one another equals 7, in the manner of a standard six-sided die. The cube-shaped container 50, containing material 11 as described above, is sequentially slid in a rotary orbit a plurality of times (for example, 5-10 times) in multiple different orientations, in one embodiment, there are three such orientations, namely, with each of three faces of the cube-shaped container 50 having a shared vertex facing up. By analogy to a standard six-sided die, these orientations are as if the sliding occurred with, the "1" facing up, then with, the "2" facing up, then with the "3" facing up.

This process may be repeated multiple times. This may result in a three-dimensional Reuleaux shape 41 (appearing somewhat similar in shape to a tetrahedron), as shown in FIGS. 5A-5H. The cube-shaped container may be approximately 8 inches on a side, or may have about 500 cubic centimeters of volume. The amount of material used may be about 40-55 cubic centimeters, or about 35-60 cubic centimeters.

While the invention has been described by way of example and in terms of particular embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A device for transforming material into a Reuleaux shape, comprising:
   a wheel;
   a platter mounted on the wheel;
   a container mounted on the platter; and
   a vertical rod, or a small shape from 2 cm to 7 cm in diameter, adapted to guide movement of the container.
2. The device of claim 1, wherein the container is removably mounted on the platter by a mount.
3. The device of claim 2, wherein the mount is size-adjustable to receive containers of different sizes.
4. The device of claim 1, wherein the platter has one or more handles.
5. The device of claim 1, wherein the wheel comprises ball bearings.
6. The device of claim 1, wherein the device has a circular orbit.
7. The device of the claim 1, wherein the container has interior dimensions approximately 9.5 cm by 9.5 cm.
8. The device of claim 1, wherein the container is plastic, polypropylene or polycarbonate.
9. The device of claim 1, wherein the container has a top.
10. The device of claim 1, wherein the container has a bottom.
11. A kit for forming a Reuleaux pentagon, comprising:
    a material comprising sand and silicone; and
    a hexagonal container.
12. The kit of claim 11, wherein the material comprises approximately 98% sand and approximately 2% silicone.
13. The kit of claim 11, wherein the container has interior dimensions approximately 9.5 cm by 9.5 cm.
14. The kit of claim 11, wherein the container is plastic, polypropylene or polycarbonate.
15. The kit of claim 11, wherein the container has a top.
16. The kit of claim 11, wherein the container has a bottom.
17. The kit of claim 11, wherein the container has knob-like feet on the bottom.
18. The kit of claim 11, wherein the material is a paste-like substance.
19. A device for transforming material into a Reuleaux shape, comprising:
    a wheel;
    a platter mounted on the wheel; and
    a container mounted on the platter, wherein the device has an orbit with a diameter and the container has an interior width, and wherein the diameter of the orbit is between one and two times the interior width of the container.
20. The device of claim 19, wherein the platter has one or more handles.

* * * * *